United States Patent
Inatomi et al.

(10) Patent No.: US 9,084,113 B2
(45) Date of Patent: Jul. 14, 2015

(54) WIRELESS BASE STATION APPARATUS, WIRELESS TERMINAL APPARATUS, AND BASE STATION AUTHENTICATION METHOD

(75) Inventors: Yasuaki Inatomi, Kanagawa (JP); Hayashi Ito, Chiba (JP)

(73) Assignee: PANASONIC INTELLECTUAL PROPERTY MANAGEMENT CO., LTD., Osaka (JP)

(*) Notice: Subject to any disclaimer, the term of this patent is extended or adjusted under 35 U.S.C. 154(b) by 858 days.

(21) Appl. No.: 13/254,433

(22) PCT Filed: Feb. 16, 2010

(86) PCT No.: PCT/JP2010/000951
§ 371 (c)(1),
(2), (4) Date: Sep. 1, 2011

(87) PCT Pub. No.: WO2010/100838
PCT Pub. Date: Sep. 10, 2010

(65) Prior Publication Data
US 2011/0317672 A1    Dec. 29, 2011

(30) Foreign Application Priority Data
Mar. 4, 2009  (JP) ................. 2009051319

(51) Int. Cl.
*H04B 7/212*   (2006.01)
*H04W 12/06*   (2009.01)
(Continued)

(52) U.S. Cl.
CPC .............. *H04W 12/06* (2013.01); *H04W 72/02* (2013.01); *H04W 88/08* (2013.01)

(58) Field of Classification Search
CPC ..... H04L 9/3273; H04L 9/3271; H04L 63/12; H04W 12/06; H04W 76/02; H04W 88/08; H04W 72/02
USPC ......... 370/337, 280, 294, 314, 321, 326, 345, 370/395.4, 458, 468; 709/222; 713/150, 713/169–171, 175; 380/249, 270
See application file for complete search history.

(56) References Cited

U.S. PATENT DOCUMENTS 6,950,521 B1 * 9/2005 Marcovici et al.
2003/0009692 A1 * 1/2003 Smith et al.
(Continued)

FOREIGN PATENT DOCUMENTS

JP    2000-3420     1/2000
JP    2006-99343    4/2006
(Continued)

OTHER PUBLICATIONS

International Search Report dated May 11, 2010.

*Primary Examiner* — Hoang-Chuong Vu
(74) *Attorney, Agent, or Firm* — Dickinson Wright PLLC

(57) ABSTRACT

A base station authentication method which allows base station authentication to be performed by more wireless terminal apparatuses within a fixed period of time. This method is a base station authentication method for TDMA wireless communication and comprises: a step in which wireless terminal apparatuses (300) select timeslots (S2200) and use the selected timeslots to transmit, to a wireless base station apparatus (200), responses indicating the start of base station authentication (S2300); a step in which the wireless base station apparatus (200) generates base station authentication data summarizing information indicating whether there has been a response for each timeslot, for the plurality of timeslots (S2400), and transmits the generated base station authentication data to the wireless terminal apparatuses (300) (S2500); and a step in which the wireless terminal apparatuses (300) perform base station authentication on the transmission origin of the base station authentication data, based on whether the received base station authentication data indicates that there were responses at the selected timeslots (S2700).

7 Claims, 39 Drawing Sheets

(51) Int. Cl.
*H04W 72/02* (2009.01)
*H04W 88/08* (2009.01)

(56) References Cited

U.S. PATENT DOCUMENTS

2003/0021257 A1* 1/2003 Sato et al.
2008/0162927 A1* 7/2008 Wang et al.
2008/0258864 A1* 10/2008 Hattori et al.
2010/0118698 A1 5/2010 Yokobori
2011/0072121 A1* 3/2011 Takasugi et al.

FOREIGN PATENT DOCUMENTS

| JP | 2007-258986 | 10/2007 |
| JP | 2007-282086 | 10/2007 |
| JP | 2008-177775 | 7/2008 |
| JP | 2009-38588 | 2/2009 |

* cited by examiner

100# WIRELESS BASE STATION APPARATUS, WIRELESS TERMINAL APPARATUS, AND BASE STATION AUTHENTICATION METHOD

TECHNICAL FIELD

The present invention relates to a radio base station apparatus, radio terminal apparatus, and base station authentication method for performing radio communication by means of time division multiple access. More particularly, the present invention relates to a radio base station apparatus, radio terminal apparatus, and base station authentication method in a radio communication system in which a plurality of radio terminal apparatuses perform authentication on a radio base station apparatus.

BACKGROUND ART

Conventionally, in many radio communication systems, when transmission/reception of important data is performed between radio communication apparatuses (hereinafter referred to as "data communication"), authentication is performed to check whether a communicating party is an authentic communicating party.

Authentication between radio communication apparatuses is based on a procedure comprising two steps: authentication communication and authentication processing. Authentication communication is communication in which authentication information including radio communication apparatus identification information such as an apparatus ID (identifier) or password is transmitted and received in order to perform authentication of a communicating party. Authentication processing is processing that confirms the validity of a communicating party (whether or not that communicating party is an authentic communicating party) by verifying authentication information received from that communicating party by means of authentication communication.

A radio communication apparatus starts data communication with a communicating party only if that communicating party has been able to be confirmed to be authentic. By this means, data communication with a non-authentic communicating party can be prevented, and leakage of information to a third party can be prevented.

Two points need to be confirmed in order to confirm the validity of a communicating party.

The first point is whether or not the contents of received authentication information were created by an authentic radio communication apparatus. Generally, electronic signature or electronic authentication technology is widely used in confirmation of this point.

The second point is whether or not received authentication information was created by the communicating party currently performing authentication communication—that is to say, whether or not received authentication information is a result of execution of illegal interception by a third party of authentication information transmitted by an authentic radio communication apparatus, and retransmission of that authentication information by that third party. Such an act of impersonation by retransmitting illegally intercepted authentication information is generally referred to as a "replay attack."

Generally, challenge/response authentication is widely used in confirmation of the second point. Challenge/response authentication is a technology whereby information sent by means of a replay attack is rejected by using a random value whose value differs on a time-by-time basis.

In this technology, first, one radio communication apparatus selects a value randomly, for example, and transmits the selected value to a radio communication apparatus that is an authentic communication destination. The radio communication apparatus that receives the random value adds a signature to the received random value using confidential information shared in advance, and returns this included in authentication information.

The radio communication apparatus that receives authentication information confirms the validity of the signature, and also confirms whether or not the random value included in the authentication information and the transmitted random value match. The radio communication apparatus then determines that the transmitter of the received authentication information is an authentic communicating party only if these values match. By this means, a radio communication apparatus can reject a replay attack.

Challenge/response authentication requires transmission time in order to transmit a random value. On the other hand, when, for example, an unspecified multitude of radio communication apparatuses that pass through a radio communication area of a certain radio base station each perform authentication on a radio communication apparatus, it is desirable for the authentication processing of each to be performed in as short a time as possible.

Thus, a technology that shortens the authentication processing of each radio communication apparatus in a time division multiple access system (hereinafter referred to as "TDMA system") radio communication system is described in Patent Literature 1, for example. Below, for convenience of explanation, a radio communication apparatus that performs authentication is referred to as a "radio terminal apparatus," and a radio communication apparatus that is authenticated is referred to as a "radio base station apparatus." Also, authentication used by a communication terminal apparatus to verify that a communicating party is an authentic radio base station apparatus is referred to as "base station authentication."

FIG. 1 is a schematic diagram for explaining a TDMA system.

As shown in FIG. 1, in a TDMA system, channels on radio waves of the same frequency undergo time division according to a concept referred to as a fixed-length frame, and each frame is further divided according to a concept referred to as a fixed-length time slot.

Time slots are randomly allocated to plurality of radio terminal apparatuses 304 through 30-3 each time authentication communication is started. Each radio terminal apparatus 30 performs communication with radio base station apparatus 20 using an allocated time slot. By this means, a TDMA system prevents the occurrence of radio wave interference among plurality of radio terminal apparatuses 30-1 through 30-3, and makes one-to-many individual communication possible.

Each frame and each time slot is identified by a number assigned to each. A frame number and time slot number change with time. A value combining a frame number and time slot number is a value that differs on a time-by-time basis. Time slot number selection is performed randomly. Therefore, a value combining a frame number and time slot number has randomness.

Thus, the technology described in Patent Literature 1 uses this combined value as a random value in challenge/response authentication.

FIG. 2 is a sequence diagram showing the overall operation of a radio communication system that uses a time slot number as a random value.

As shown in FIG. 2, first, for example, first radio terminal apparatus 30-1 transmits an authentication request to radio base station apparatus 20, using a time slot with time slot number N of a frame with frame number M (S41). Then radio base station apparatus 20 generates authentication data from values M and N, using a shared function shared by first radio terminal apparatus 30-1 in advance (S42), and transmits the generated authentication data to first radio terminal apparatus 30-1 (S43). In a similar way, first radio terminal apparatus 30-1 generates authentication data from values M and N, using a shared function shared by first radio terminal apparatus 30-1 in advance, and confirms whether or not the generated authentication data and authentication data received from the radio base station apparatus match (S44). If the two data match, first radio terminal apparatus 30-1 starts data communication with radio base station apparatus 20 (S45). Then, for example, second radio terminal apparatus 30-2 transmits an authentication request in a similar way in a time slot with the next time slot number, N+1.

Thus, the technology described in Patent Literature 1 does not require separate transmission of a random value, and enables base station authentication to be performed in a shorter time.

CITATION LIST

Patent Literature

PTL 1
Japanese Patent Application Laid-Open No. 2007-282086

SUMMARY OF INVENTION

Technical Problem

In order for more radio terminal apparatuses to perform base station authentication within a fixed period of time, it is necessary to shorten the length of time of a time slot (hereinafter referred to as the time slot length). However, a problem with the technology described in Patent Literature 1 is that the time slot length cannot be shortened effectively, and the number of radio terminal apparatuses that can perform base station authentication within a fixed period of time is limited. The reasons are as follows.

As is also clear from FIG. 2, authentication communication requires at least three periods of time: reception time 51 for a radio base station apparatus to receive an authentication request, computation time 52 for computing authentication data, and transmission time 53 for transmitting authentication data. Therefore, with the technology described in Patent Literature 1, time slot lengths cannot be shortened to less than a period of time resulting from adding together these times 51, 52, and 53.

It is therefore an object of the present invention to provide a radio base station apparatus, radio terminal apparatus, and base station authentication method that enable more radio terminal apparatuses to perform base station authentication within a fixed period of time.

Solution to Problem

A radio base station apparatus of the present invention is a radio base station apparatus that performs radio communication with a plurality of radio terminal apparatuses by means of time division multiple access, and has: a response information reception section that receives response information indicating that base station authentication is to be started from the radio terminal apparatus; a base station authentication data generation section that generates base station authentication data summarizing information indicating whether or not the response information has been received for each time slot; and a base station authentication data transmission section that transmits the generated base station authentication data to the radio terminal apparatus.

A radio terminal apparatus of the present invention is one of a plurality of radio terminal apparatuses that perform communication with a radio base station apparatus by means of time division multiple access, and has: a time slot selection section that selects a time slot; a response information transmission section that transmits response information indicating that base station authentication is to be started to the radio base station apparatus, using the selected time slot; a base station authentication data reception section that receives base station authentication data in correspondence to the transmitted response information; and a base station authentication section that performs base station authentication for a transmitter of the base station authentication data, based on whether or not the received, base station authentication data indicates that the response information was received in the selected time slot.

A base station authentication method of the present invention is a base station authentication method implemented between a radio base station apparatus and a plurality of radio terminal apparatuses that perform radio communication with this radio base station by means of time division multiple access, and has: a step of the radio terminal apparatus selecting a time slot, and transmitting response information indicating that base station authentication is to be started to the radio base station apparatus, using the selected time slot; a step of the radio base station apparatus generating base station authentication data summarizing for a plurality of time slots information indicating whether or not the response information has been received for each time slot, and transmitting the generated base station authentication data to the radio base station apparatus; and a step of the radio terminal apparatus performing base station authentication for a transmitter of the base station authentication data, based on whether or not the received base station authentication data indicates that the response information was received in the selected time slot.

Advantageous Effects of Invention

The present invention enables more radio terminal apparatuses to perform base station authentication within a fixed period of time by aggregating processing for each radio terminal apparatus.

DESCRIPTION OF EMBODIMENTS

Now, embodiments of the present invention will be described in detail with reference to the accompanying drawings. The present invention is in no way limited to the embodiments described below, and may be implemented in various modes without departing from the scope of the present invention.

Embodiment 1

Figure 3:
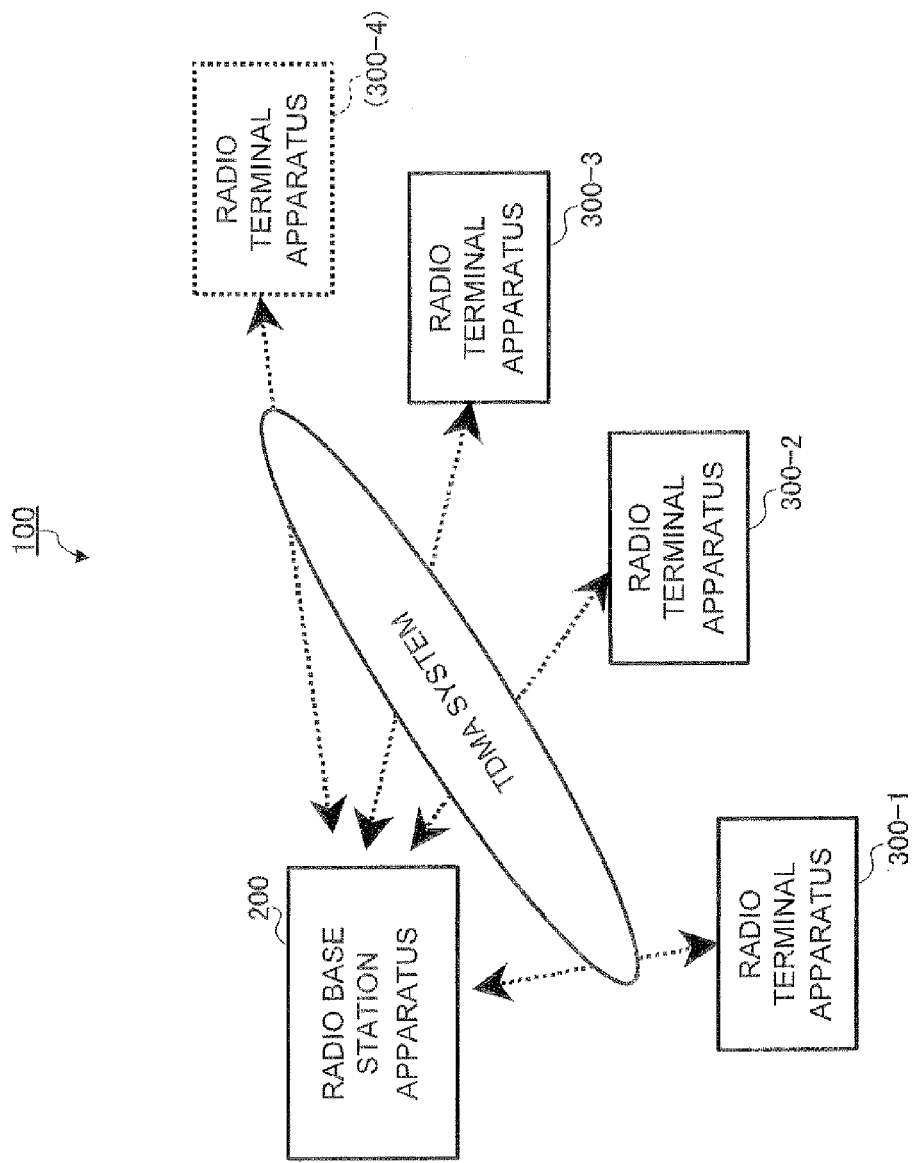
FIG. 3 is a schematic configuration diagram showing an example of the configuration of a radio communication system according to Embodiment 1 of the present invention.

FIG. 3 is a schematic configuration diagram showing an example of the configuration of a radio communication system according to Embodiment 1 of the present invention.

In FIG. 3, radio communication system 100 according to this embodiment has radio base station apparatus 200, and first through third radio terminal apparatuses 300-1 through 300-3 located in the communication area of radio base station apparatus 200. First through third radio terminal apparatuses 300-1 through 300-3 have the same configuration. For convenience, first through third radio terminal apparatuses 300-1 through 300-3 are described below using radio terminal apparatus 300 as a generic term.

Radio base station apparatus 200 performs radio communication with first through third radio terminal apparatuses 300-1 through 300-3 by means of a TDMA system.

Figure 4:
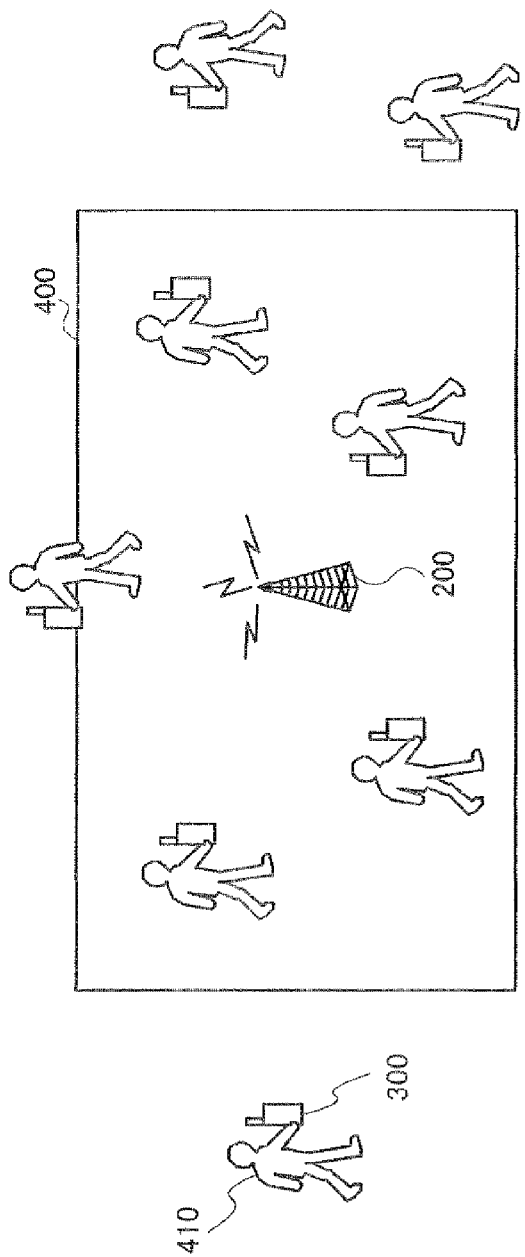
FIG. 4 is a schematic diagram showing an example of an environment in which a radio communication system according to Embodiment 1 is applied.

FIG. 4 is a schematic diagram showing an example of an environment in which radio communication system 100 is applied.

As shown in FIG. 4, an unspecified multitude of pedestrians 410 who pass through communication area 400 of radio base station apparatus 200 each carry radio terminal apparatus 300. Radio terminal apparatus 300 is, for example, an active tag, which is one kind of RFID (radio frequency identification). Radio base station apparatus 200 is, for example, an active tag reader/writer.

The number of radio terminal apparatuses 300 simultaneously located within communication area 400 varies. For example, when fourth radio terminal apparatus 300-4 moves into the communication area, as shown in FIG. 3, radio base station apparatus 200 performs radio communication by means of a TDMA system with fourth radio terminal apparatus 300-4 as well.

Specifically, radio communication system 100 is applied to a child monitoring service, for example. An example of a child monitoring service is a service whereby, when children pass through a school gate, when and/or whether a child arrives at or leaves school is detected, and a teacher or guardian is notified in the event of an abnormality. In this case, radio base station apparatus 200 is installed at the school gate, and radio terminal apparatuses 300 are carried by the children. At school arrival and leaving times, a large number of children are expected to pass by in a short period of time.

Also, radio communication system 100 is applied to a vehicle proximity notification service, for example. An example of a vehicle proximity notification service is a service that detects a pedestrian walking near a corner that is liable to be a blind spot for a vehicle, and notifies nearby vehicles. In this case, radio base station apparatus 200 is installed at a corner, and radio terminal apparatus 300 is carried by a pedestrian.

Radio terminal apparatus 300 performs individual data communication with radio base station apparatus 200 using a time slot allocated to that radio terminal apparatus 300. A user carrying a radio terminal apparatus receives services such as a communication record and information provision by means of this individual data communication.

However, which radio terminal apparatus 300 will pass through communication area 400 when cannot be identified in advance. Therefore, it is difficult to allocate time slots to radio terminal apparatuses 300 in advance.

Thus, in this embodiment, radio terminal apparatus 300 randomly selects a time slot to be used for communication, and notifies radio base station apparatus 200 of which time slot has been selected, using the selected time slot.

Time slot identification is performed using a time slot number. Time slot synchronization is performed, for example, by having radio base station apparatus 200 notify each radio terminal apparatus 300 of a frame start position by transmission of an authentication start request described later herein.

In order to determine whether a communicating party with which it is about to start data communication is a valid communicating party (here, radio base station apparatus 200), each radio terminal apparatus 300 performs base station authentication on the communicating party prior to data communication.

In this authentication, each radio terminal apparatus 300 confirms that received authentication information is not from a replay attack. The reason for this is that there is a possibility of a third party attempting to start data communication with radio terminal apparatus 300 illegally by impersonating radio base station apparatus 200.

Radio communication system 100 according to this embodiment makes it possible for more radio terminal apparatuses 300 to perform base station authentication within a fixed period of time by performing base station authentication with different contents from conventional base station authentication. The following description will focus on areas of the configuration and operation of radio communication system 100 that relate to base station authentication.

Here, it is assumed that information used on a shared basis between radio base station apparatus 200 and radio terminal apparatus 300 (hereinafter referred to as "shared information") is already set in each apparatus when shipped. Shared information includes the radio data format and command code, and a data generation rule for generating base station authentication data, described later herein, as well as a data generation rule for generating comparison data described later herein, the number of slots, the slot interval, and so forth.

Provision may also be made for this shared information to be transmitted from radio base station apparatus 200 to radio terminal apparatus 300 each time base station authentication is performed. For example, radio base station apparatus 200 adds shared information to an authentication start request or base station authentication data, and radio terminal apparatus 300 acquires shared information from a transmitted authentication start request or base station authentication data.

First, a general description of the overall operation of radio communication system 100 will be given with reference to FIG. 5 through FIG. 11.

Figure 5:
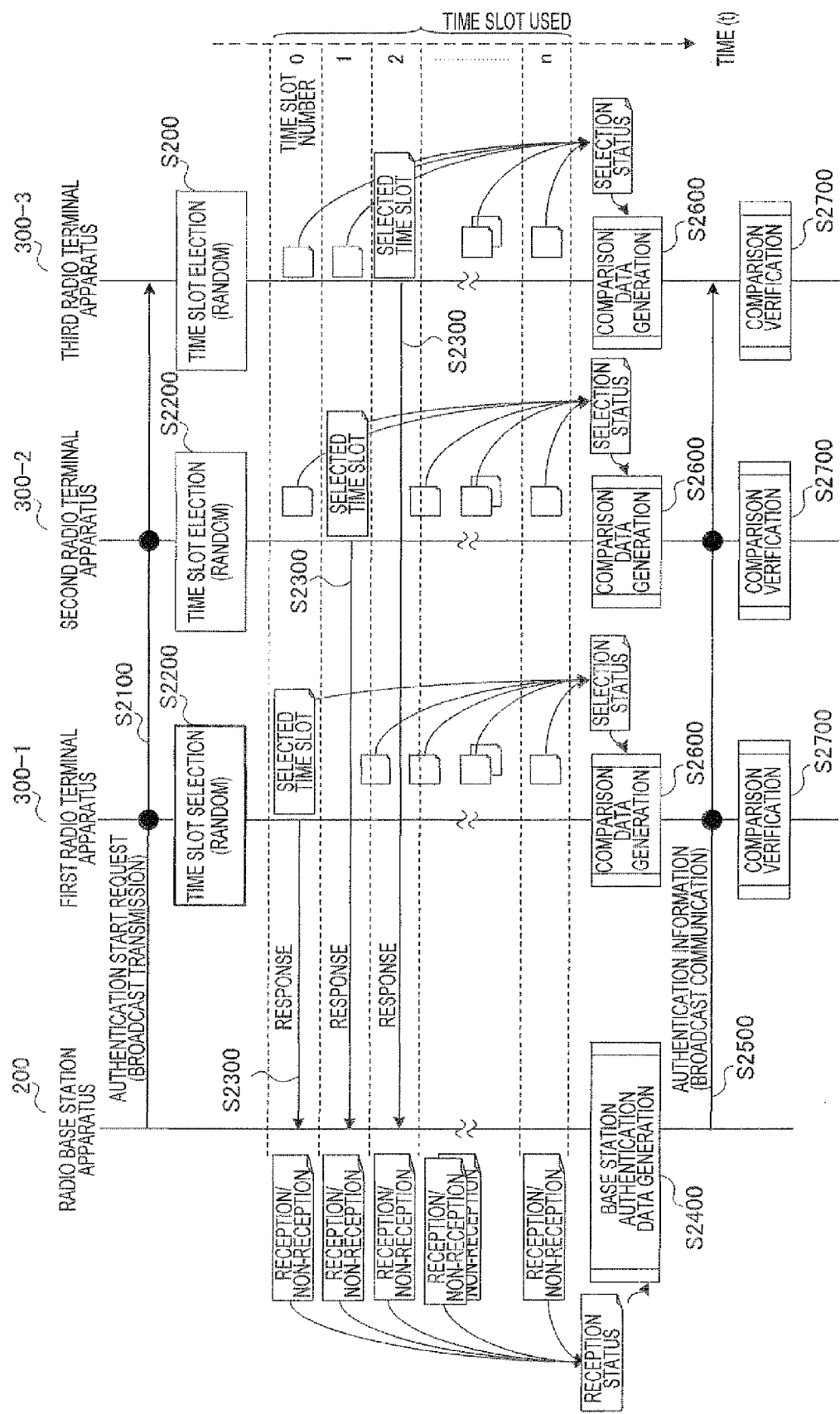
FIG. 5 is a sequence diagram showing an example of the overall operation of a radio communication system according to Embodiment 1.

FIG. 5 is a sequence diagram showing an example of the overall operation of radio communication system 100.

First, radio base station apparatus 200 periodically performs broadcast transmission at predetermined intervals of an authentication start request, which is a command to start authentication communication, to radio terminal apparatuses 300 located in communication area 400 (S2100). Here, it is assumed that base station authentication described later herein is executed each time radio terminal apparatus 300 receives an authentication start request.

It is desirable for the above predetermined interval to be of a length that is within the duration of passage through the communication area by radio terminal apparatus 300. This duration of passage through the communication area can be calculated from the size of communication area 400 and the average speed of movement of a user carrying radio terminal apparatus 300. Also, it is desirable for the above predetermined interval to be of a length that includes a time slot for base station authentication and a time slot for data communication.

Broadcast transmission to radio terminal apparatuses 300 located within communication area 400 is referred to below simply as "broadcast transmission." Here, it is assumed that first through third radio terminal apparatuses 300-1 through 300-3 are radio terminal apparatuses present within communication area 400 such as shown in FIG. 4.

Having received an authentication start request, first through third radio terminal apparatuses 300-1 through 300-3 each randomly select at least one time slot, for example, in response to the received authentication start request (S2200).

Then first through third radio terminal apparatuses 300-1 through 300-3 transmit a response indicating that base station authentication is to be started to radio base station apparatus 200, using their selected time slots (S2300).

The configuration of an authentication start request transmitted by radio base station apparatus 200, and a response returned by radio terminal apparatus 300 in response to this authentication start request, will now be described.

Figure 6:
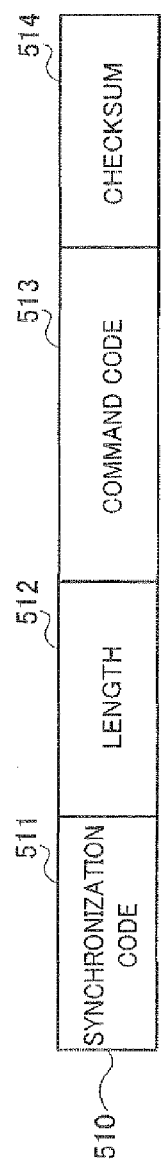
FIG. 6 is a drawing showing an example of the data configuration of an authentication start request and response in Embodiment 1.

FIG. 6 is a drawing showing an example of the data configuration of an authentication start request and response.

As shown in FIG. 6, radio data 510 comprises synchronization code 511, length 512, command code 513, and checksum 514, arranged in that order. Synchronization code 511 contains a predetermined code indicating the start of radio data. Length 512 contains the length of the following data (here, the total length of command code 513 and checksum 514) as a byte length, for example. Command code 513 contains a command code indicating the type of that radio data. Checksum 514 contains an error detection code for that radio data.

Radio base station apparatus 200 enters a predetermined command code indicating that that radio data 510 is an authentication start request in command code 513, and generates authentication start request radio data. Radio terminal apparatus 300 detects the start of radio data based on synchronization code 511, and extracts command code 513 and checksum 514 based on Length 512. Then, when the above predetermined command code has been entered in command code 513, radio terminal apparatus 300 determines that that radio data 510 is an authentication start request. In addition, radio terminal apparatus 300 determines whether or not there is an error in that radio data 510 based on checksum 514.

Radio terminal apparatus 300 enters a predetermined command code (ACKnowledgement: ACK) in command code 513, and generates response radio data. This predetermined command code is information indicating that that radio data 510 is a response to an authentication start request. Radio base station apparatus 200 detects the start of radio data based on synchronization code 511, and extracts command code 513 and checksum 514 based on Length 512. Then, when the above predetermined command code has been entered in command code 513, radio base station apparatus 200 determines that that radio data 510 is a response. In addition, radio base station apparatus 200 determines whether or not there is an error in that radio data 510 based on checksum 514.

Radio base station apparatus 200 receives responses from first through third radio terminal apparatuses 300-1 through 300-3. Then radio base station apparatus 200 generates base station authentication data based on a reception status indicating whether or not there is reception for each time slot (S2400 in FIG. 5). Base station authentication data is data summarizing, for a plurality of time slots, information indicating whether or not there has been a response to an authentication start request for each time slot. Details of base station authentication data will be given later herein.

Then radio base station apparatus 200 performs broadcast transmission of authentication information to first through third radio terminal apparatuses 300-1 through 300-3 (S2500). Authentication information includes base station authentication data generated by radio base station apparatus 200, and identification information such as an apparatus ID or password.

Authentication information is transmitted and received stored in radio data with the same kind of format as an authentication start request and response.

Figure 7:
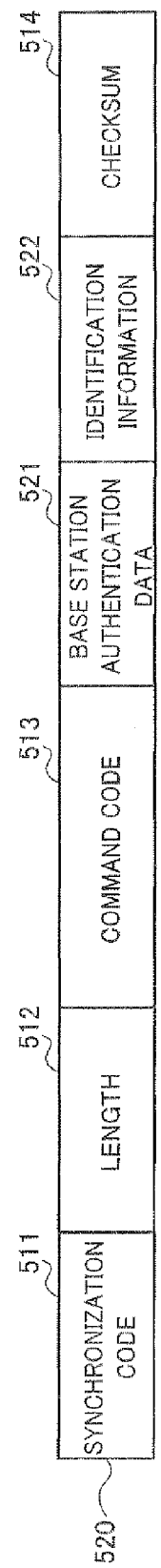
FIG. 7 is a drawing showing an example of the data configuration of authentication information including base station authentication data in Embodiment 1.

FIG. 7 is a drawing showing an example of the data configuration of authentication information including base station authentication data. FIG. 7 corresponds to FIG. 6, and parts in FIG. 7 identical to those in FIG. 6 are assigned the same reference codes as in FIG. 6.

As shown in FIG. 7, authentication information radio data 520 comprises synchronization code 511, length 512, command code 513, base station authentication data 521, identification information 522, and checksum 514, arranged in that order. Length 512 here contains the total length of command code 513, base station authentication data 521, identification information 522, and checksum 514.

Radio base station apparatus 200 enters a predetermined command code indicating that that radio data 520 is authentication information in command code 513, and generates authentication information radio data 520. When the above predetermined command code has been entered in command code 513, radio terminal apparatus 300 extracts base station authentication data 521 and identification information 522. Checksum 514 may also be an electronic signature.

Radio base station apparatus 200 performs transmission of authentication information including base station authentication data by generating and transmitting such radio data 520.

On the other hand, first through third radio terminal apparatuses 300-1 through 300-3 each generate comparison data based on which time slots they have selected (S2600 in FIG. 5). Comparison data is data associating an identifier indicating selection or non-selection with each of the time slots. Details of comparison data will be given later herein.

Then first through third radio terminal apparatuses 300-1 through 300-3 perform base station authentication based on base station authentication data included in identification information received from radio base station apparatus 200, and generated comparison data (S2700). Specifically, first through third radio terminal apparatuses 300-1 through 300-3 compare base station authentication data with comparison data, and determine whether or not these data match. A state in which base station authentication data and comparison data match is a state in which all selected time slots indicated by comparison data are included in time slots for which base station authentication data indicates that there has been a response. Details of determination of a match between base station authentication data and comparison data will be given later herein.

If base station authentication data and comparison data match, first through third radio terminal apparatuses 300-1 through 300-3 determine that the transmitter of authentication information is an authentic communicating party (here, radio base station apparatus 200), continue communication, and perform data communication. Specifically, radio terminal apparatus 300 transmits a notification of the success of base station authentication to radio base station apparatus 200. Also, radio terminal apparatus 300 performs data communication with radio base station apparatus 200 using a data communication time slot placed after a base station authentication time slot.

On the other hand, if base station authentication data and comparison data do not match, first through third radio terminal apparatuses 300-1 through 300-3 determine that the transmitter of authentication information is not an authentic communicating party (but, for example, a radio terminal apparatus performing a replay attack), and do not perform data communication.

It is desirable for radio base station apparatus 200 to add a signature to authentication information, as described above, with the object of preventing tampering with transmitted authentication information. In this case, in the base station authentication process radio terminal apparatus 300 performs verification of whether or not an authentic signature has been added to authentication information.

Figure 8:
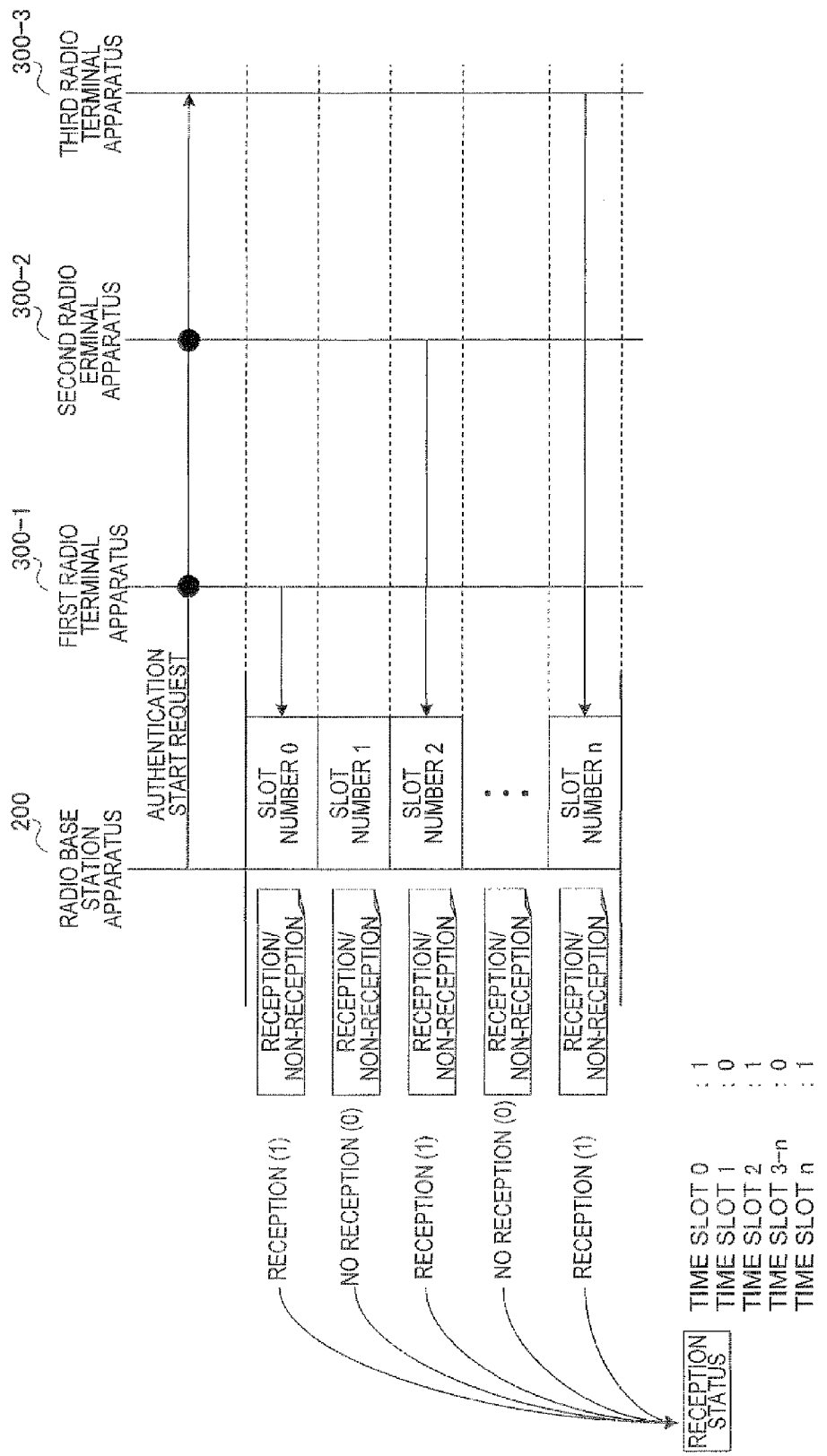
FIG. 8 is a schematic diagram showing an example of a data generation rule for base station authentication data in Embodiment 1.

FIG. 8 is a schematic diagram showing an example of a data generation rule for generation of base station authentication data by radio base station apparatus 200.

Here, the number of the last time slot of a frame used in base station authentication (hereinafter referred to as "default time slot number") is assumed to be "n". Also, first through third radio terminal apparatuses 300-1 through 300-3 are assumed to have selected time slots with time slot numbers "0", "2", and "n", respectively. Furthermore, radio base station apparatus 200 uses "1" as an identifier indicating that a time slot is one for which there is a response from radio terminal apparatus 300, and uses "0" as an identifier indicating that a time slot is one for which there is no response.

In this case, radio base station apparatus 200 holds information denoting the value of identifiers corresponding to time slot numbers "0", "2", and "n" for which there is reception as "1", and denoting the value of identifiers corresponding to all other time slot numbers as "0", as a reception status. That is to say, a reception status is information indicating whether or not there is a response for each time slot.

Here, it is assumed that the contents of a data generation rule for base station authentication data comprise above identifiers indicating whether or not there is a response, arranged in ascending time slot number order. In this case, base station authentication data generated by radio base station apparatus 200 is "1, 0, 1, 0, . . . , 1", as in the example shown in FIG. 8.

On the other hand, in FIG. 5, first through third radio terminal apparatuses 300-1 through 300-3 each generate comparison data based on a selection status denoting whether or not there is selection for each time slot (S2400).

Figure 9:
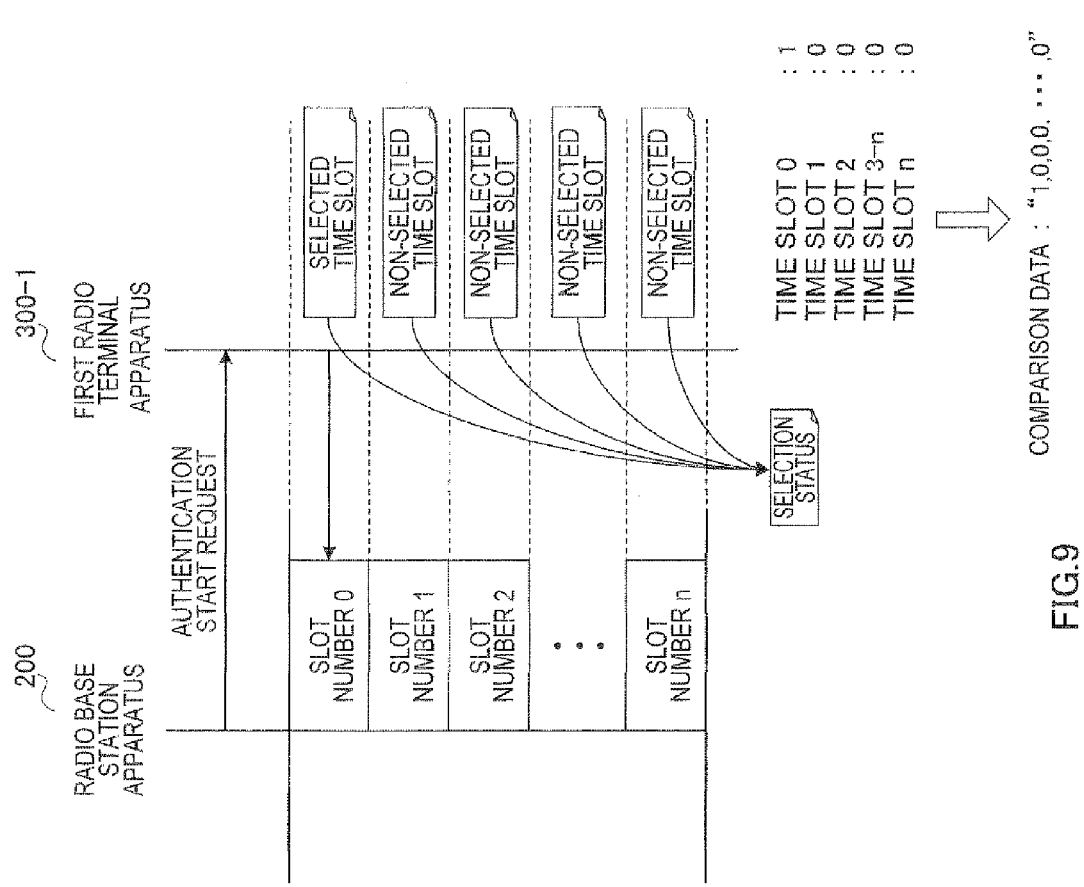
FIG. 9 is a schematic diagram showing an example of a data generation rule for comparison data in Embodiment 1.

FIG. 9 is a schematic diagram showing an example of a data generation rule for generation of comparison data by radio terminal apparatus 300. Here, an outline of comparison data generation by first radio terminal apparatus 300-1 is illustrated.

As explained above, first radio terminal apparatus 300-1 has selected time slot number "0". Here, an identifier indicating that a time slot is one that has been selected (for which there has been a response) is assumed to be "1", and an identifier indicating that a time slot is one that has not been selected (for which there has not been a response) is assumed to be "0". In this case, as shown in FIG. 9, the selection status of time slots in first radio terminal apparatus 300-1 is that the identifier value corresponding to time slot number "0" is "1", and the identifier value corresponding to other time slot numbers is "0".

In this embodiment, it is assumed that the contents of a data generation rule for comparison data comprise above identifiers indicating whether or not there is selection, arranged in ascending time slot number order, the same as the data generation rule for base station authentication data. In this case, comparison data generated by radio base station apparatus 200 is "1, 0, 0, 0, . . . , 0", as in the example shown in FIG. 9.

Figure 10:
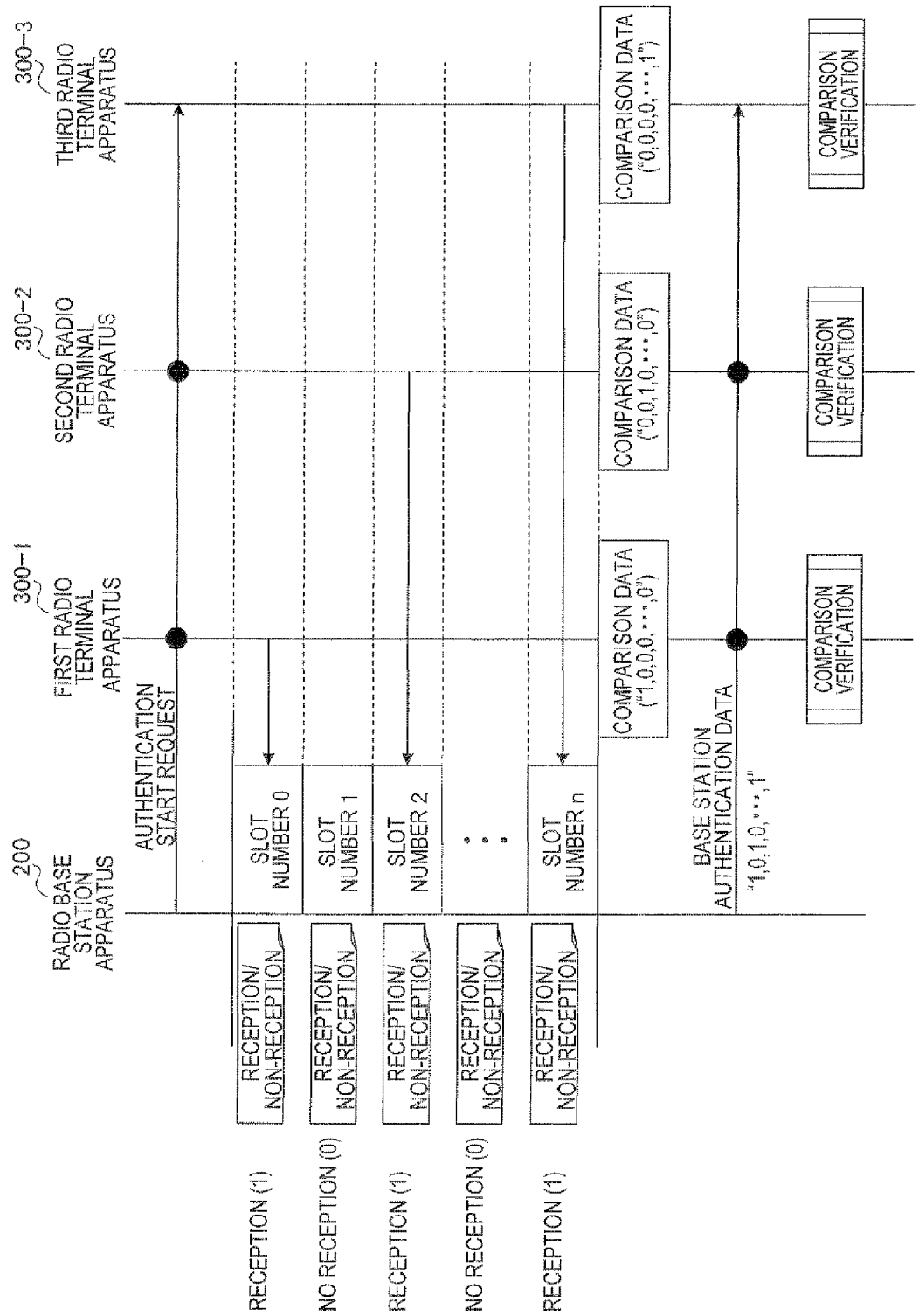
FIG. 10 is a schematic diagram showing an example of the relationship between base station authentication data and comparison data in Embodiment 1.

FIG. 10 is a schematic diagram showing the relationship between base station authentication data and comparison data in radio terminal apparatuses 300 in the examples shown in FIG. 8 and FIG. 9.

Base station authentication data generated by radio terminal apparatus 300 is "1, 0, 1, 0, . . . , 1", while comparison data generated by first through third radio terminal apparatuses 300-1 through 300-3 is, in order, "1, 0, 0, 0, . . . , 0", "0, 0, 1, 0, . . . , 0", and "0, 0, 0, 0, . . . , 1".

That is to say, in a bit pattern configuring base station authentication data, a bit position with a value of "1" in any of the plurality of comparison data has a value of "1". This is because presence or absence of response transmission/reception and a time slot for which response transmission/reception has been performed match between radio base station apparatus 200 and radio terminal apparatuses 300, and also because a data generation rule for base station authentication data and a data generation rule for comparison data have the same contents—namely, arrangement of identifiers in ascending time slot number order.

The fact that, in a bit pattern configuring base station authentication data, a bit position with a value of "1" in any of the plurality of comparison data has a value of "1", is also the same in a case in which one radio terminal apparatus 300 uses a plurality of time slot numbers. That is to say, the same also applies to a case in which radio terminal apparatus 300 selects a plurality of time slots to perform response transmission.

The fact that, in base station authentication data, a bit position for which the comparison data value is "1" has a value of "1", indicates that base station authentication data and comparison data match. Such matching of base station authentication data and comparison data can be implemented, for example, by determining whether or not the result of ANDing base station authentication data and comparison data matches comparison data.

Which time slot number is used to give a response is selected randomly, as described above. By this means, base station authentication data and comparison data have a high degree of randomness.

Figure 11:
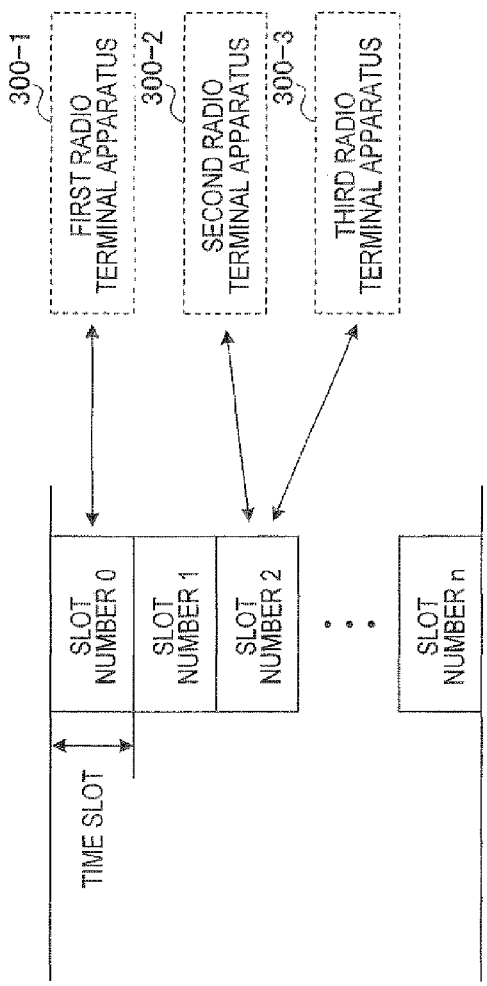
FIG. 11 is a schematic diagram showing an example of the nature of time slot number duplicate selection according to Embodiment 1.

Since time slot number selection is performed independently by each radio terminal apparatus 300, a plurality of radio terminal apparatuses 300 may select the same time slot number. FIG. 11 is a schematic diagram showing an example of how a plurality of radio terminal apparatuses 300 select the same time slot number.

However, this possibility of duplicate time slot number selection further improves the reliability of base station authentication. This is because duplication of a selected time slot number occurs randomly, and the number of bits with a value of "1" in base station authentication data varies within the range of the number of radio terminal apparatuses 300 that transmit a response.

Each radio terminal apparatus 300 performs carrier sensing in a selected time slot prior to response transmission. It is desirable for a radio terminal apparatus 300 that detects that another radio terminal apparatus 300 is giving a response first in a selected time slot to perform processing as having transmitted a response without actually transmitting a response. By this means, even in the event of duplicate time slot number selection, a collision can be prevented, and base station authentication can be performed in the same way as in the case of non-duplicate selection. When actual data communication is performed after base station authentication, adjustment of the time slot used is performed once again so that there is no duplication.

Due to the mechanics of the present invention, it is possible that the reliability of base station authentication may decrease when there are many bits with a value of "1" in base station authentication data. For example, when base station authentication data is generated in which all bits have a value of "1", if a replay attack is performed using this base station authentication data, base station authentication will be successful for all radio terminal apparatuses 300.

To prevent such a scenario, it is desirable for radio base station apparatus 200 to monitor the total number of bits with a value of "1" when generating base station authentication data. In this case, if the total number of bits with a value of "1"—that is, the number of time slots for which a response is received—exceeds a predetermined threshold value, radio base station apparatus 200 stops processing without transmitting base station authentication data, and transmits an authentication start request again after a predetermined interval. At this time, radio base station apparatus 200 may also update the number of slots before transmitting an authentication start request.

Figure 1:
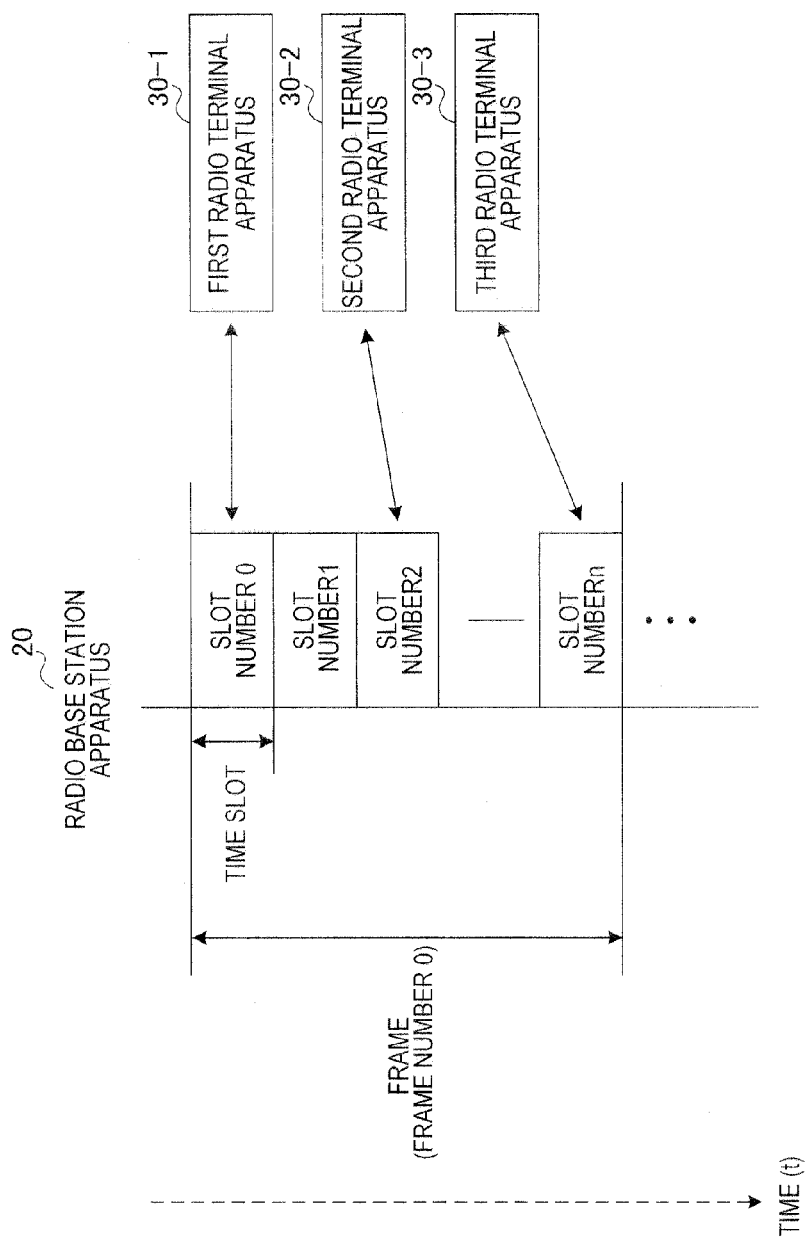
FIG. 1 is a schematic diagram for explaining a TDMA system.
Figure 2:
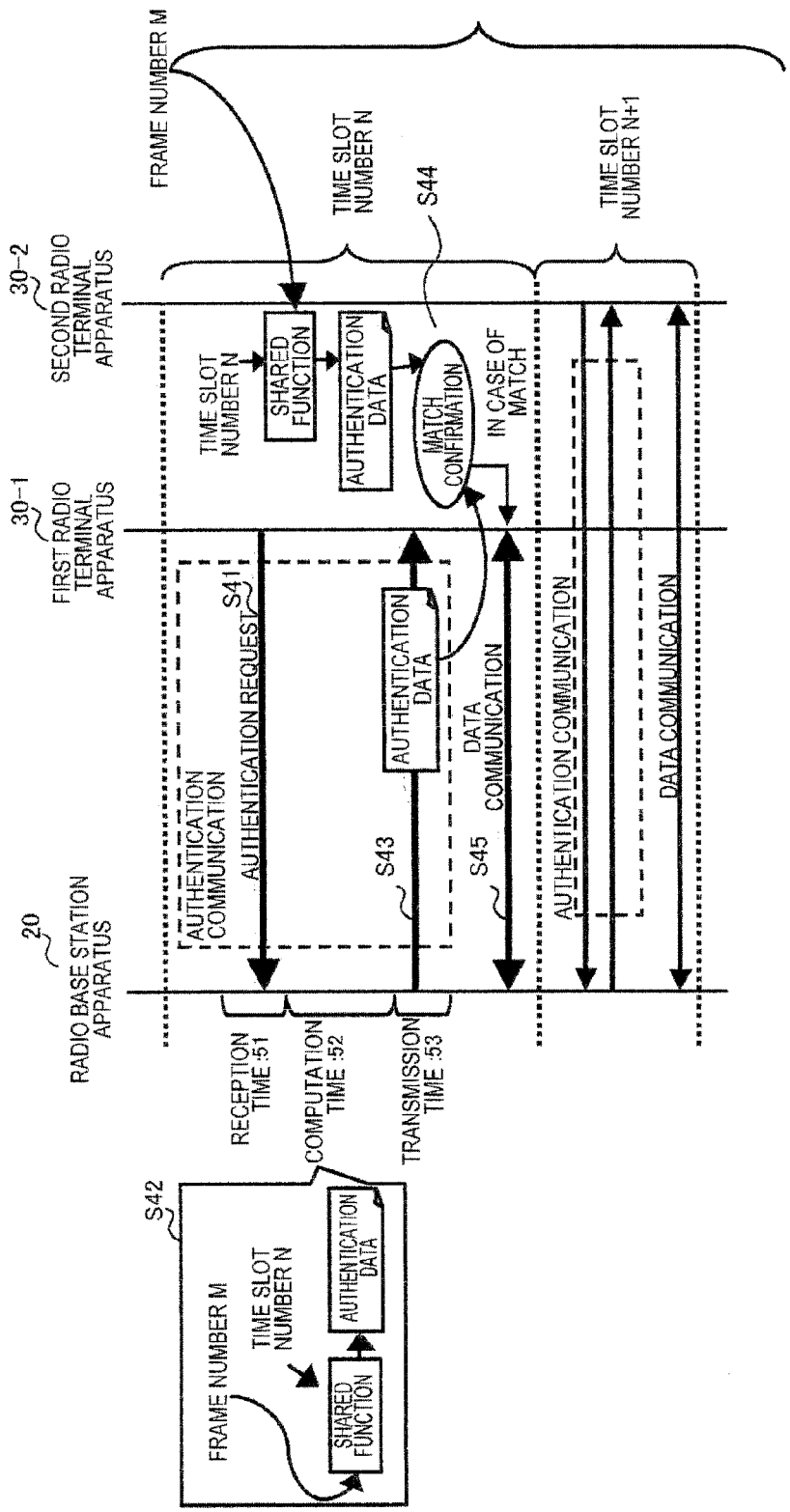
FIG. 2 is a sequence diagram showing the overall operation of a radio communication system that uses current technology.

In order to show the superiority of radio communication system 100 according to this embodiment, the sequence diagram of this embodiment shown in FIG. 5 will now be compared with the sequence diagram of a conventional radio communication system shown in FIG. 2.

In a conventional radio communication system, base station authentication data generation and transmission must be completed for each time slot. Also, if three radio terminal apparatuses are located within the communication area of a radio base station apparatus, for example, base station authentication data generation and transmission are performed at least three times each.

In contrast, in this embodiment, although three radio terminal apparatuses 300-1 through 300-3 are located within communication area 400 shown in FIG. 4, base station authentication data generation and transmission need only be performed at least once each.

That is to say, radio communication system 100 according to this embodiment can shorten the length of each time slot by the time required for base station authentication data generation and transmission. On the other hand, radio communication system 100 according to this embodiment needs the time required for authentication start request transmission, base station authentication data generation, and base station authentication data transmission, separately from a time slot used for a response to an authentication start request. However, since these are all performed once each, this additional time can be kept to less than the total reduction in time. Also, when addition of a signature to base station authentication data is performed, signature addition need only be performed once.

Therefore, radio communication system 100 according to this embodiment enables the number of time slots that can be placed for a fixed period of time to be increased, and enables more radio terminal apparatuses 300 to perform base station authentication within a fixed period of time.

The configuration and operation of each apparatus will now be described.

Figure 12:
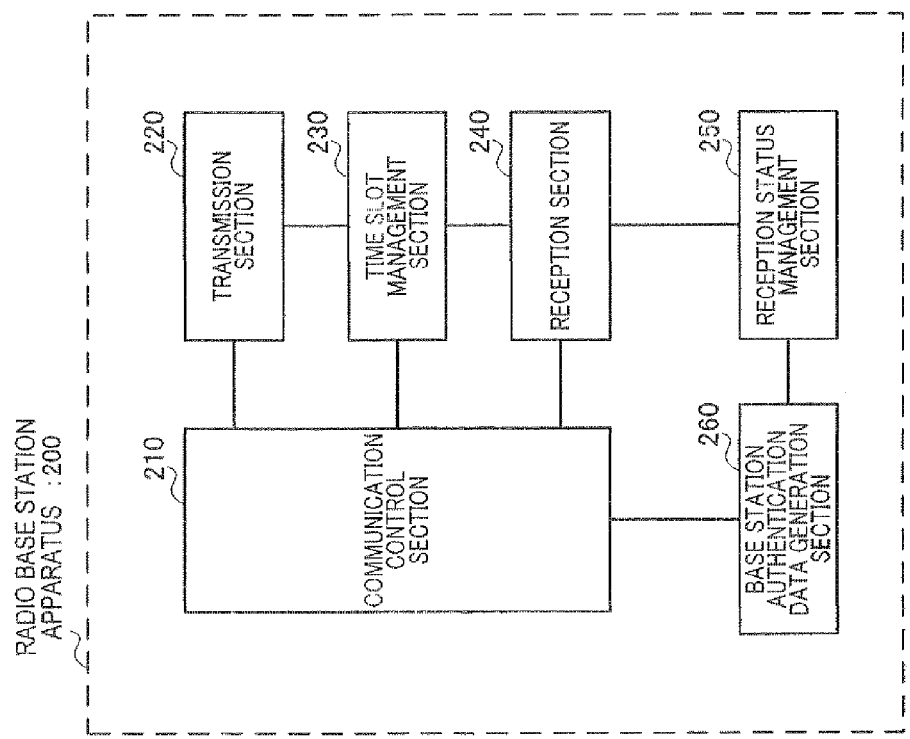
FIG. 12 is a block diagram showing an example of the configuration of a radio base station apparatus according to Embodiment 1.

FIG. 12 is a block diagram showing an example of the configuration of radio base station apparatus 200.

In FIG. 12, radio base station apparatus 200 has communication control section 210, transmission section 220, time slot management section 230, reception section 240, reception status management section 250, and base station authentication data generation section 260.

Communication control section 210 controls the overall operation of radio base station apparatus 200. Transmission section 220, time slot management section 230, reception section 240, and base station authentication data generation section 260 are connected to communication control section 210.

Transmission section 220 generates an authentication start request, and performs broadcast transmission of the generated authentication start request. Transmission section 220 also performs broadcast transmission of authentication information that includes base station authentication data generated by base station authentication data generation section 260.

Time slot management section 230 holds a default slot number and default time slot interval (time slot length) in advance. Time slot management section 230 is connected to transmission section 220 and reception section 240. After transmission section 220 performs broadcast transmission of an authentication start request, at least, time slot management section 230 manages time slots shared by radio terminal apparatuses 300 located within communication area 400.

Reception section 240 receives a response to an authentication start request, transmitted from each radio terminal apparatus 300, for each time slot, and notifies reception status management section 250 of whether or not there is a response for each received time slot. Transmission of this response by each radio terminal apparatus 300 is performed using a time slot selected by that radio terminal apparatus 300.

Reception status management section 250 is connected to reception section 240. Reception status management section 250 manages a reception status indicating whether or not there is a response for each time slot in reception section 240.

Base station authentication data generation section 260 holds in advance a data generation rule for base station authentication data. Base station authentication data generation section 260 is connected to reception status management section 250. Base station authentication data generation section 260 generates base station authentication data in accordance with a held data generation rule, based on a reception status managed by reception status management section 250.

Radio base station apparatus 200 has, for example, a CPU (central processing unit), a storage medium such as ROM (read only memory) that stores a control program, working memory such as RAM (random access memory), and so forth. In this case, the functions of the above sections are implemented by execution of the control program by the CPU.

Figure 13:
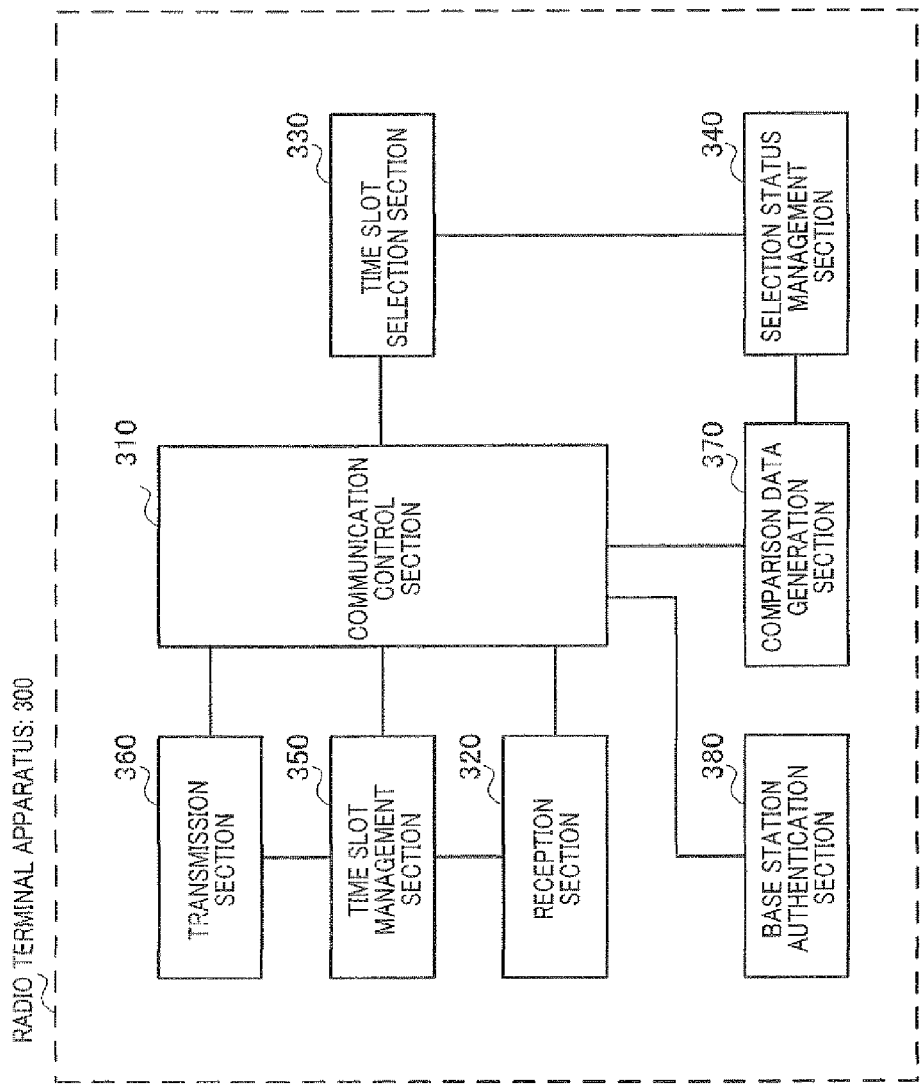
FIG. 13 is a block diagram showing an example of the configuration of a radio terminal apparatus according to Embodiment 1.

FIG. 13 is a block diagram showing an example of the configuration of radio terminal apparatus 300.

In FIG. 13, radio terminal apparatus 300 has communication control section 310, reception section 320, time slot selection section 330, selection status management section 340, time slot management section 350, transmission section 360, comparison data generation section 370, and base station authentication section 380.

Communication control section 310 controls the overall operation of radio terminal apparatus 300. Reception section 320, time slot selection section 330, time slot management section 350, transmission section 360, comparison data generation section 370, and base station authentication section 380 are connected to communication control section 310.

Reception section 320 receives an authentication start request, and authentication information including base station authentication data, transmitted from radio base station apparatus 200.

Time slot selection section 330 randomly selects a time slot to be used for a response to an authentication start request from among the time slots managed by time slot management section 350.

Selection status management section 340 is connected to time slot selection section 330. Selection status management section 340 manages a selection status indicating whether or not there is selection for each time slot in time slot selection section 330.

Time slot management section 350 holds a default slot number and default time slot interval (time slot length) in advance. Time slot management section 350 is connected to reception section 320 and transmission section 360. After time slot selection section 330 selects a time slot, at least, time slot management section 350 manages time slots shared with radio base station apparatus 200.

Transmission section 360 transmits a response to an authentication start request to radio base station apparatus 200, using a time slot selected by time slot selection section 330.

Comparison data generation section 370 holds in advance a data generation rule for comparison data. Comparison data generation section 370 is connected to selection status management section 340. Comparison data generation section 370 generates comparison data in accordance with a data generation rule held in advance, based on a selection status managed by selection status management section 340.

Base station authentication section 380 performs base station authentication based on whether or not received base station authentication data and comparison data generated by comparison data generation section 370 match.

Radio base station apparatus 200 has, for example, a CPU, a storage medium such as ROM that stores a control program, working memory such as RAM, and so forth. In this case, the functions of the above sections are implemented by execution of the control program by the CPU.

The operation of each section of radio base station apparatus 200 and each section of radio terminal apparatus 300 will now be described in detail. Operation of radio base station apparatus 200 and radio terminal apparatus 300 as illustrated in FIG. 5 through FIG. 11 is implemented, for example, by having the sections configuring these apparatuses perform the operations described below.

First, the operation of each section of radio base station apparatus 200 will be described.

Figure 14:
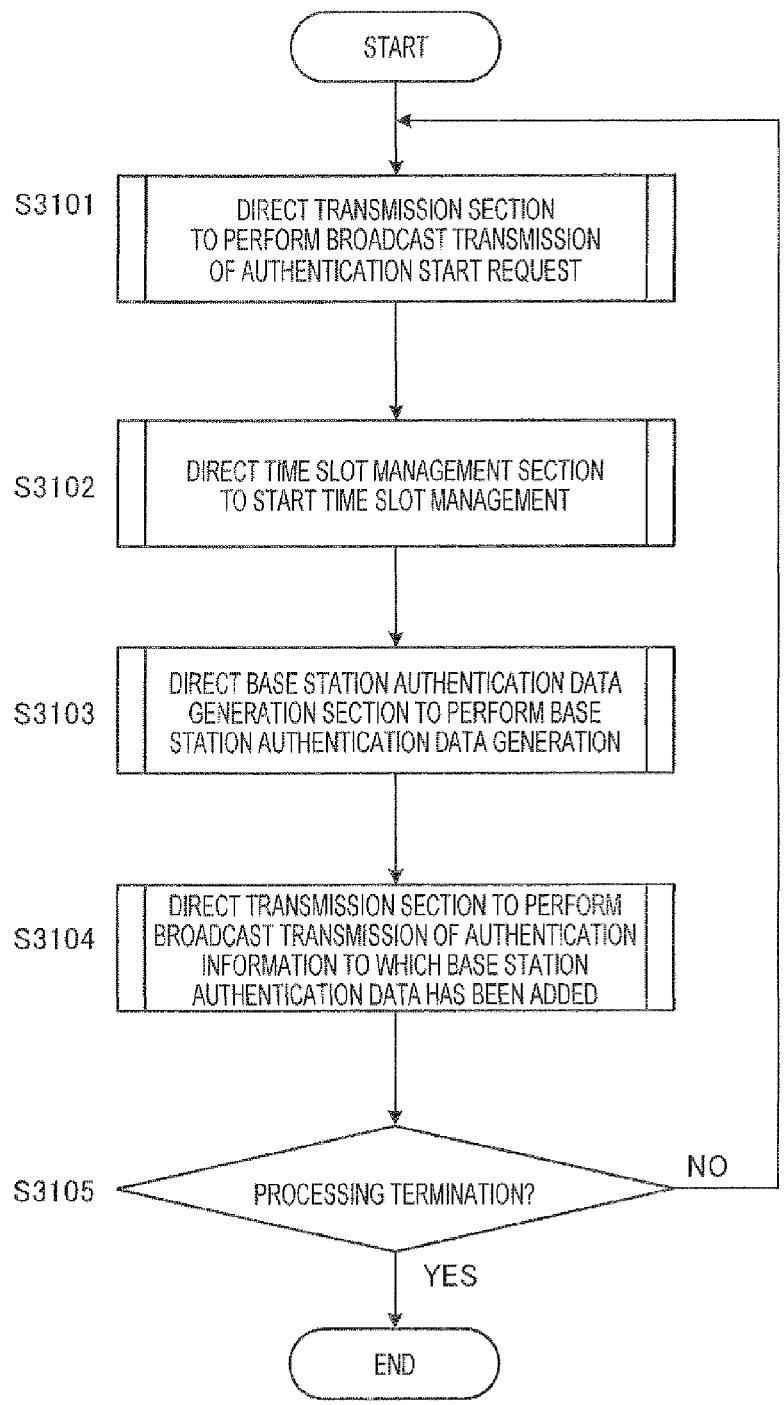
FIG. 14 is a flowchart showing an example of the operation of a communication control section of a radio base station apparatus according to Embodiment 1.

FIG. 14 is a flowchart showing an example of the operation of communication control section 210 of radio base station apparatus 200.

First, communication control section 210 directs transmission section 220 to perform broadcast transmission of an authentication start request (S3101), after which processing is returned from transmission section 220. Communication control section 210 performs time management, and, for example, directs transmission section 220 to perform broadcast transmission of an authentication start request at arbitrary time intervals. Next, communication control section 210 directs time slot management section 230 to start time slot management (S3102). Then, when processing is returned from time slot management section 230, communication control section 210 directs base station authentication data generation section 260 to perform base station authentication data generation (S3103).

Then, when processing is returned together with base station authentication data from base station authentication data generation section 260, communication control section 210 passes base station authentication data to transmission section 220, and directs transmission section 220 to perform broadcast transmission of authentication information that includes the base station authentication data (S3104). Then communication control section 210 determines whether or not termination of processing relating to base station authentication has been directed by means of an operator operation or the like, and if termination has not been directed, repeats the above processing (S3105).

Figure 15:
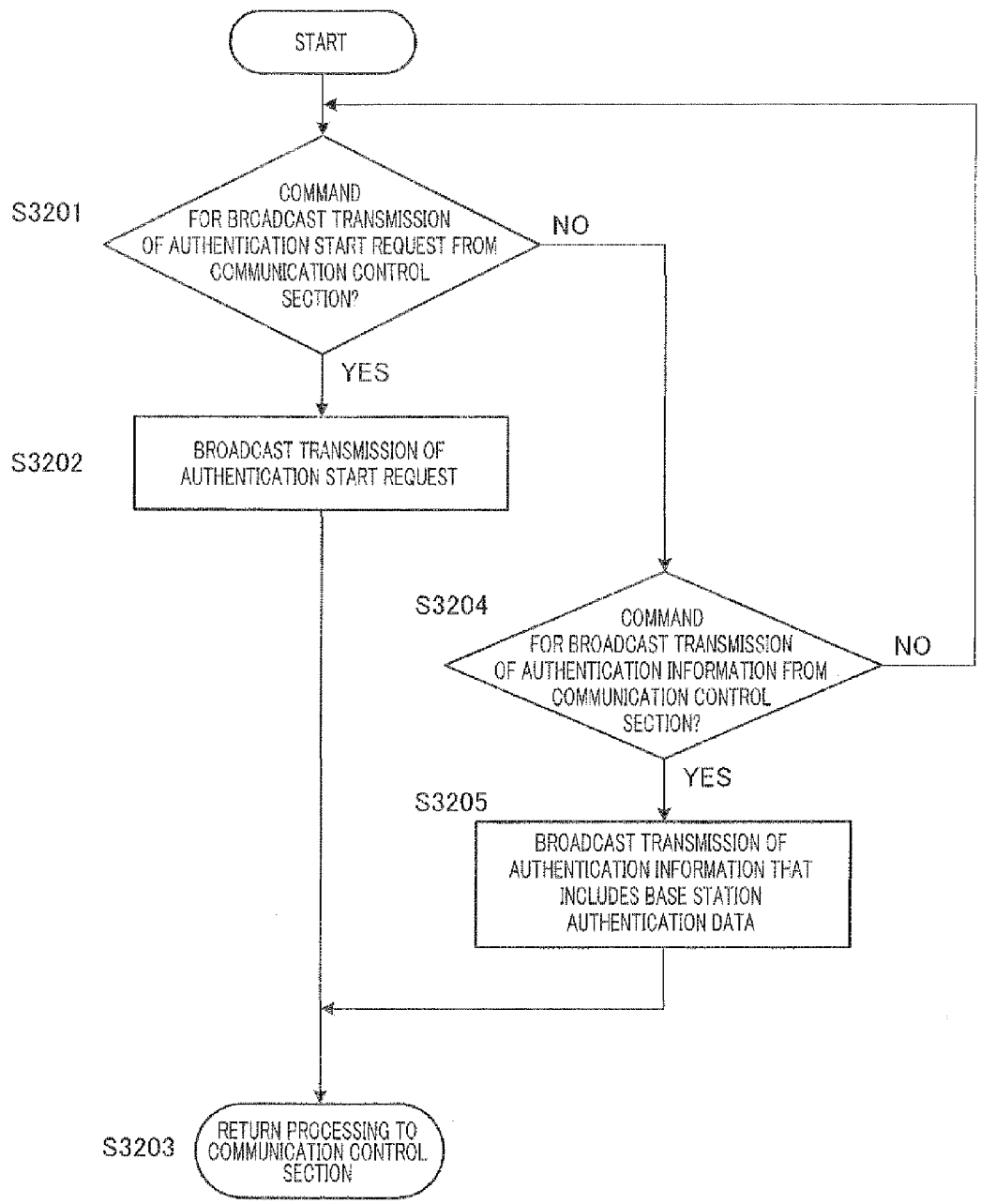
FIG. 15 is a flowchart showing an example of the operation of a transmission section of a radio base station apparatus according to Embodiment 1.

FIG. 15 is a flowchart showing an example of the operation of transmission section 220 of radio base station apparatus 200.

Transmission section 220 receives a command for broadcast transmission of an authentication start request from communication control section 210, performs broadcast transmission of an authentication start request (S3201) each time a command is received (S3201: YES), and when transmission is completed, returns processing to communication control section 210 (S3203). Transmission section 220 also receives a command for broadcast transmission of authentication information that includes base station authentication data from communication control section 210. Each time a command is received (S3204: YES), transmission section 220 performs broadcast transmission of authentication information that includes base station authentication data (S3205), and when transmission is completed, returns processing to communication control section 210 (S3203).

Figure 16:
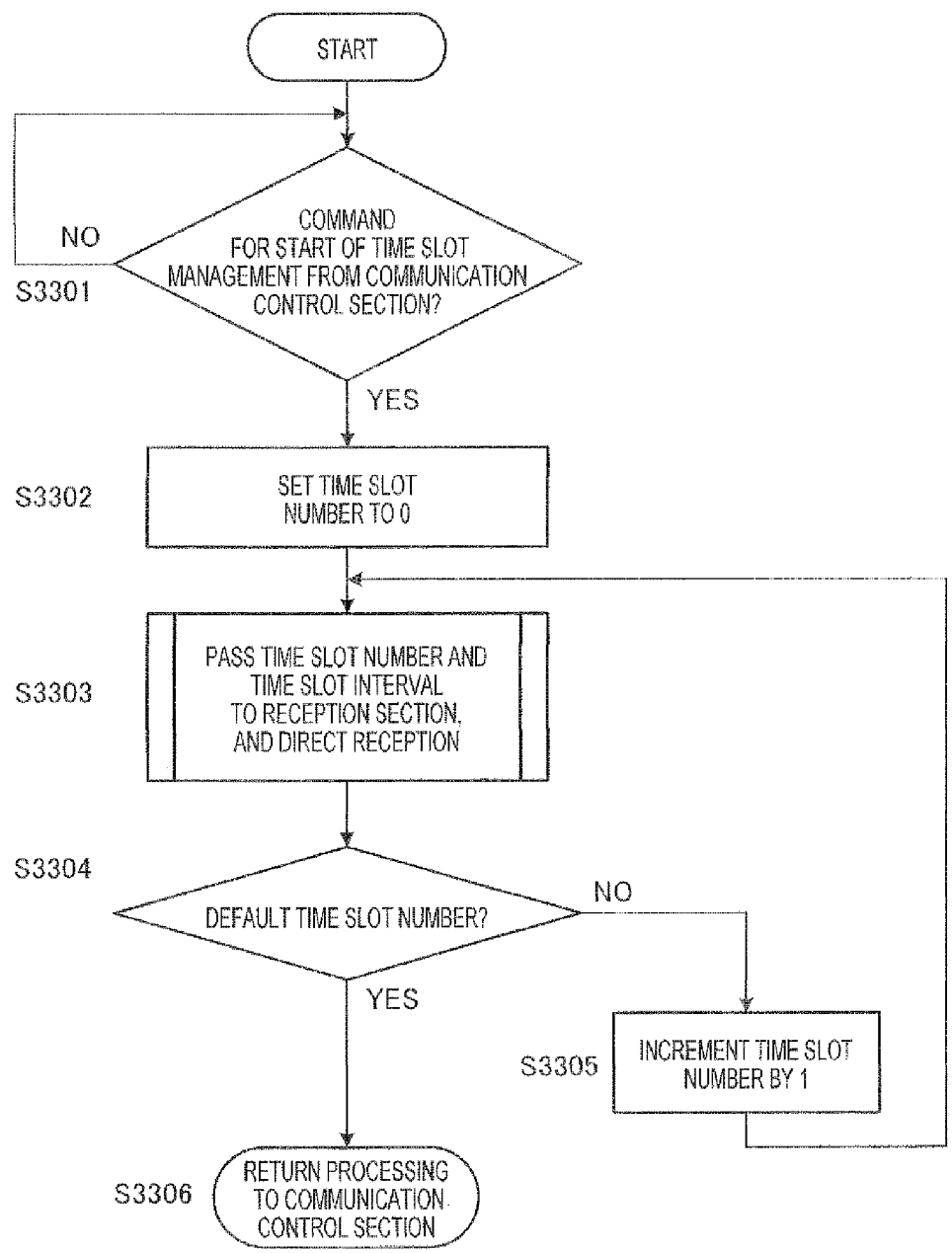
FIG. 16 is a flowchart showing an example of the operation of a time slot management section of a radio base station apparatus according to Embodiment 1.

FIG. 16 is a flowchart showing an example of the operation of time slot management section 230 of radio base station apparatus 200.

Time slot management section 230 receives a command for the start of time slot management from communication control section 210, and performs time slot management (S3302 through S3305) each time a command is received (S3301: YES).

More specifically, time slot management section 230 first sets the time slot number to initial value "0" (S3302). Next, time slot management section 230 increments the time slot number until the time slot number reaches a default time slot number, based on a default time slot interval (S3305). During this time, time slot management section 230 passes each time slot number and the default time slot interval to reception section 240, and directs response reception (S3303 through S3305).

Then, when the incremented time slot number reaches default time slot number n (S3304: YES), time slot management section 230 returns processing to communication control section 210 (S3306).

Figure 17:
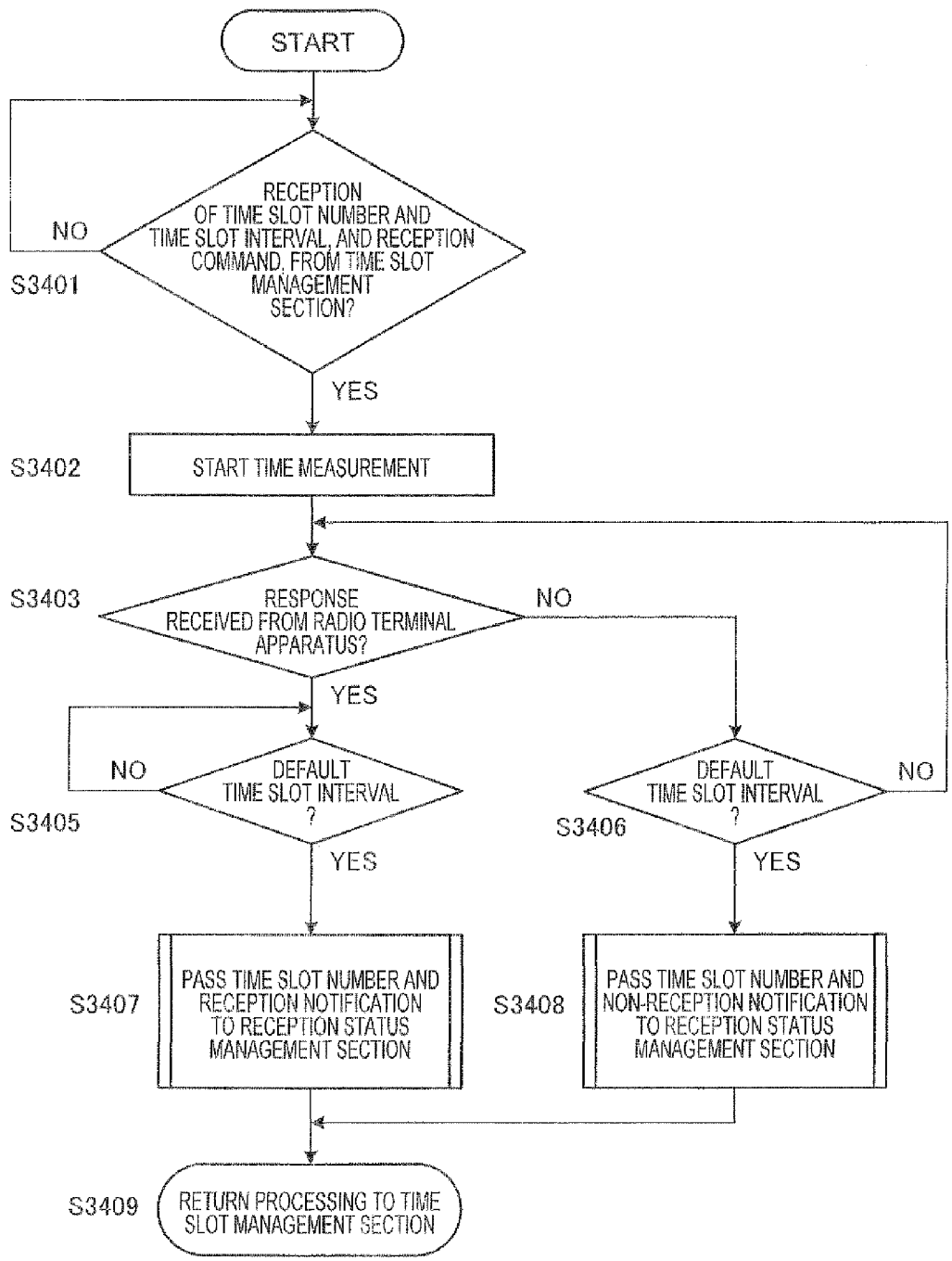
FIG. 17 is a flowchart showing an example of the operation of a reception section of a radio base station apparatus according to Embodiment 1.

FIG. 17 is a flowchart showing an example of the operation of reception section 240 of radio base station apparatus 200.

Reception section 240 receives a time slot number and time slot interval specification, and a reception command, from time slot management section 230. Next, each time a command is received (S3401: YES), reception section 240 waits for a response from radio terminal apparatus 300 with the specified time slot interval as a unit (S3402 through S3406).

More specifically, reception section 240 first starts time measurement (S3402), and determines whether or not a response has been received from radio terminal apparatus 300 by the time the default slot interval is reached (S3403). Then, if a response has been received (S3403: YES, S3405: YES), reception section 240 passes the time slot number and a reception notification indicating that a response has been received to reception status management section 250 (S3407). On the other hand, if a response has not been received (S3403: NO, S3406: YES), reception section 240 passes the time slot number and a non-reception notification that is information indicating that a response has not been received to reception status management section 250 (S3408).

Then, after reception section 240 passes a reception notification or non-reception notification to reception status management section 250, when processing is returned from reception status management section 250, reception section 240 returns processing to time slot management section 230.

Figure 18:
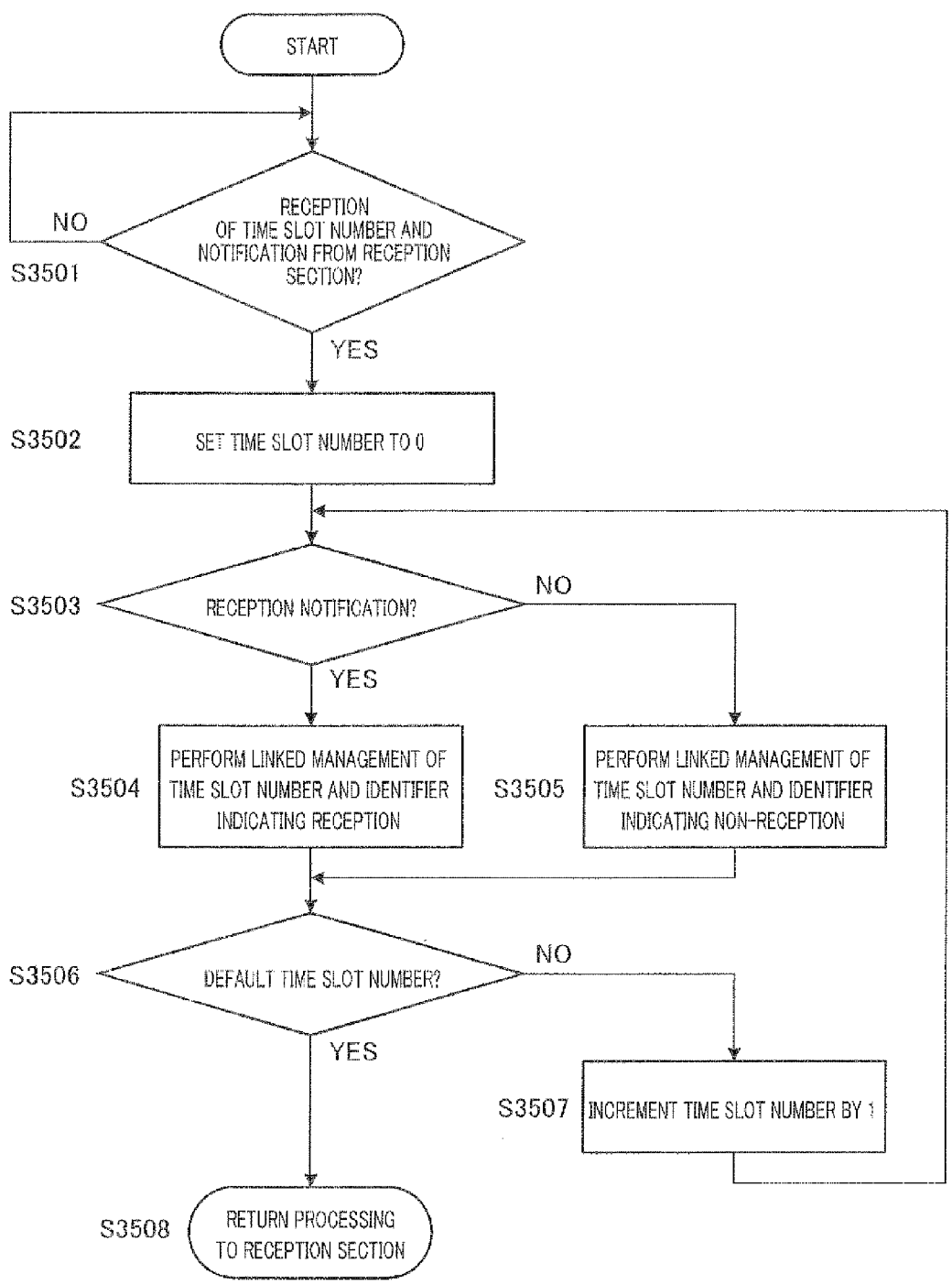
FIG. 18 is a flowchart showing an example of the operation of a reception status management section of a radio base station apparatus according to Embodiment 1.

FIG. 18 is a flowchart showing an example of the operation of reception status management section 250 of radio base station apparatus 200.

Reception status management section 250 receives a time slot number and a reception notification or non-reception notification from reception section 240. Next, each time a notification is received (S3501: YES), reception status management section 250 manages a reception status that links a received time slot number to an identifier corresponding to notification contents (S3502 through S3505).

More specifically, reception status management section 250 first sets the time slot number to initial value "0" (S3502). Next, reception status management section 250 determines whether or not a reception notification corresponds to each time slot number while incrementing the time slot number until the time slot number reaches default time slot number n. If a reception notification has been received (S3503: YES), reception status management section 250 performs linked management of that time slot number and an identifier indicating reception (S3504). On the other hand, if a reception notification has not been received (a non-reception notification has been received) (S3503: NO), reception status management section 250 performs linked management of that time slot number and an identifier indicating non-reception (S3505).

Then, when the incremented time slot number reaches default time slot number n (S3506: YES), reception status management section 250 returns processing to reception section 240 (S3508).

Figure 19:
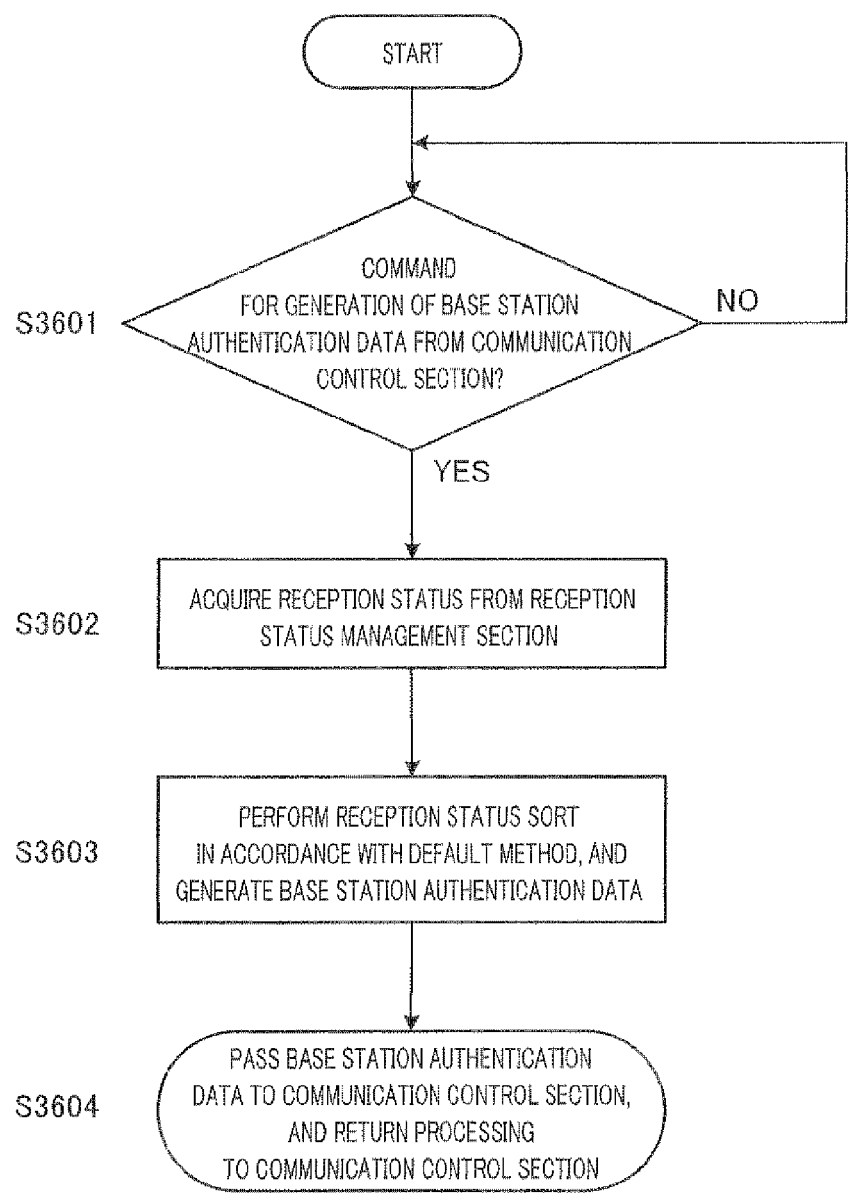
FIG. 19 is a flowchart showing an example of the operation of a base station authentication data generation section of a radio base station apparatus according to Embodiment 1.

FIG. 19 is a flowchart showing an example of the operation of base station authentication data generation section 260 of radio base station apparatus 200.

Base station authentication data generation section 260 receives a command to generate base station authentication data from communication control section 210. Then, each time a base station authentication data generation command is received (S3601: YES), base station authentication data generation section 260 acquires a reception status from reception status management section 250 (S3602).

Then base station authentication data generation section 260 generates base station authentication data in accordance with a default data generation rule (S3603). Base station authentication data generation section 260 then passes generated base station authentication data to communication control section 210, and returns processing to communication control section 210 (S3604). Here, it is assumed that base station authentication data generation section 260 generates base station authentication data according to the data generation rule illustrated in FIG. 8. That is to say, base station authentication data generation section 260 generates base station authentication data by sorting information corresponding to each time slot number in a reception status into ascending time slot number order.

Next, the operation of each section of radio terminal apparatus 300 will be described.

Figure 20:
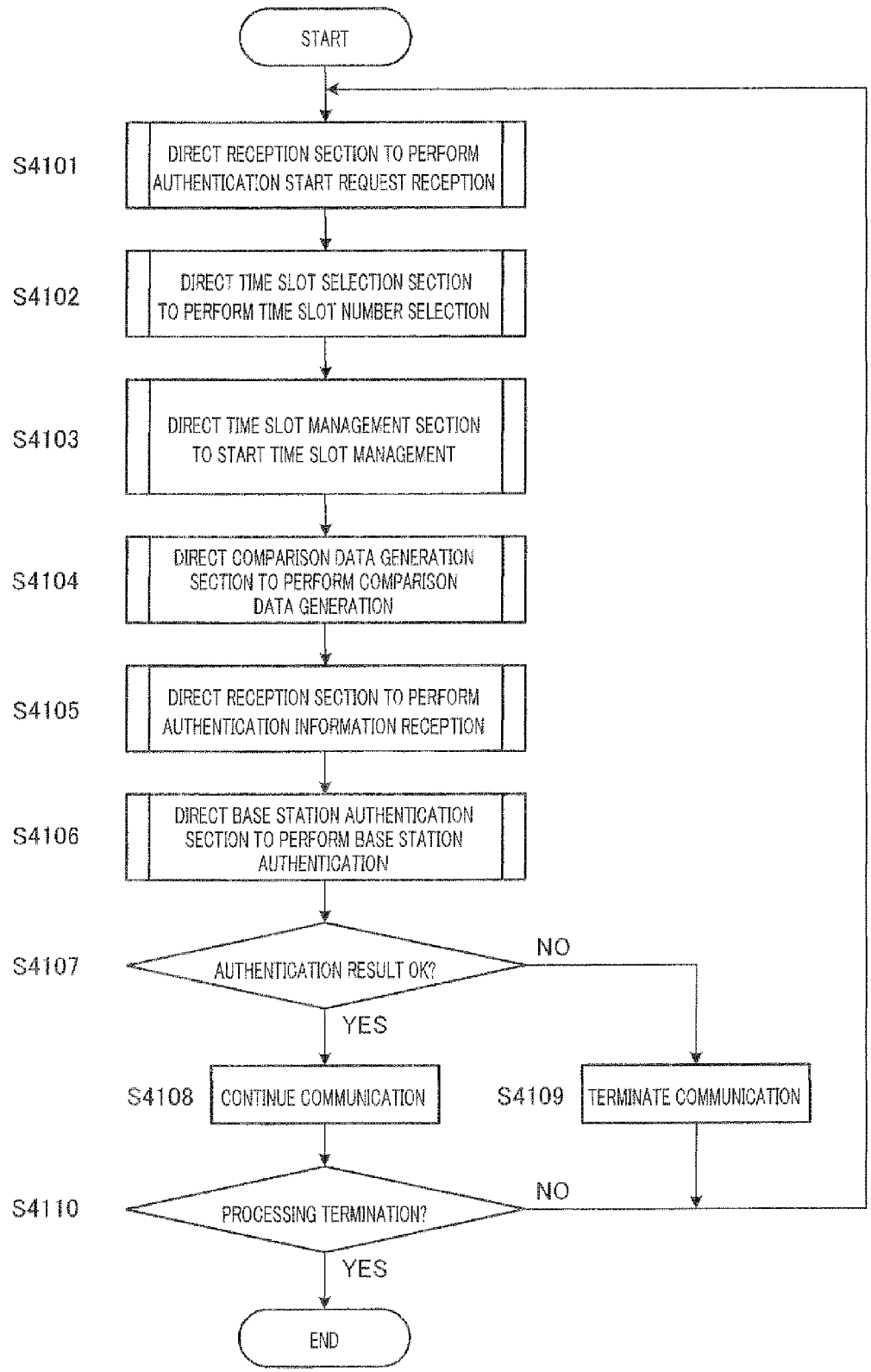
FIG. 20 is a flowchart showing an example of the operation of a communication control section of a radio terminal apparatus according to Embodiment 1.

FIG. 20 is a flowchart showing an example of the operation of communication control section 310 of radio terminal apparatus 300.

First, communication control section 310 directs reception section 320 to perform authentication start request reception (S4101). When processing is returned from reception section 320, communication control section 310 next directs time slot selection section 330 to select a time slot number for responding to an authentication start request (S4102). Processing is then returned to communication control section 310 from time slot selection section 330 together with a time slot number. Next, communication control section 310 passes the time slot number received from time slot selection section 330 to time slot management section 350, and directs time slot management section 350 to start time slot management (S4103).

When processing is returned from time slot management section 350, communication control section 310 directs comparison data generation section 370 to generate comparison data (S4104). When processing is returned from comparison data generation section 370 together with comparison data, communication control section 310 directs reception section 320 to receive authentication information that includes base station authentication data from radio base station apparatus 200 (S4105).

Then processing is returned to communication control section 310 together with base station authentication data from reception section 320. Next, communication control section 310 passes base station authentication data received from reception section 320 and comparison data received from comparison data generation section 370 to base station authentication section 380, and gives a command for base station authentication (S4106). Processing is returned to communication control section 310 together with an authentication result from base station authentication section 380.

Next, if the received authentication result is "OK" (S4107: YES), communication control section 310 continues communication processing (S4108). On the other hand, if the received authentication result is "NG" (S4107: NO), communication control section 310 terminates communication processing (S4109). Then communication control section 310 determines whether or not termination of processing relating to base station authentication has been directed by means of a user operation or the like, and if termination has not been directed, repeats the above processing (S4110).

Figure 21:
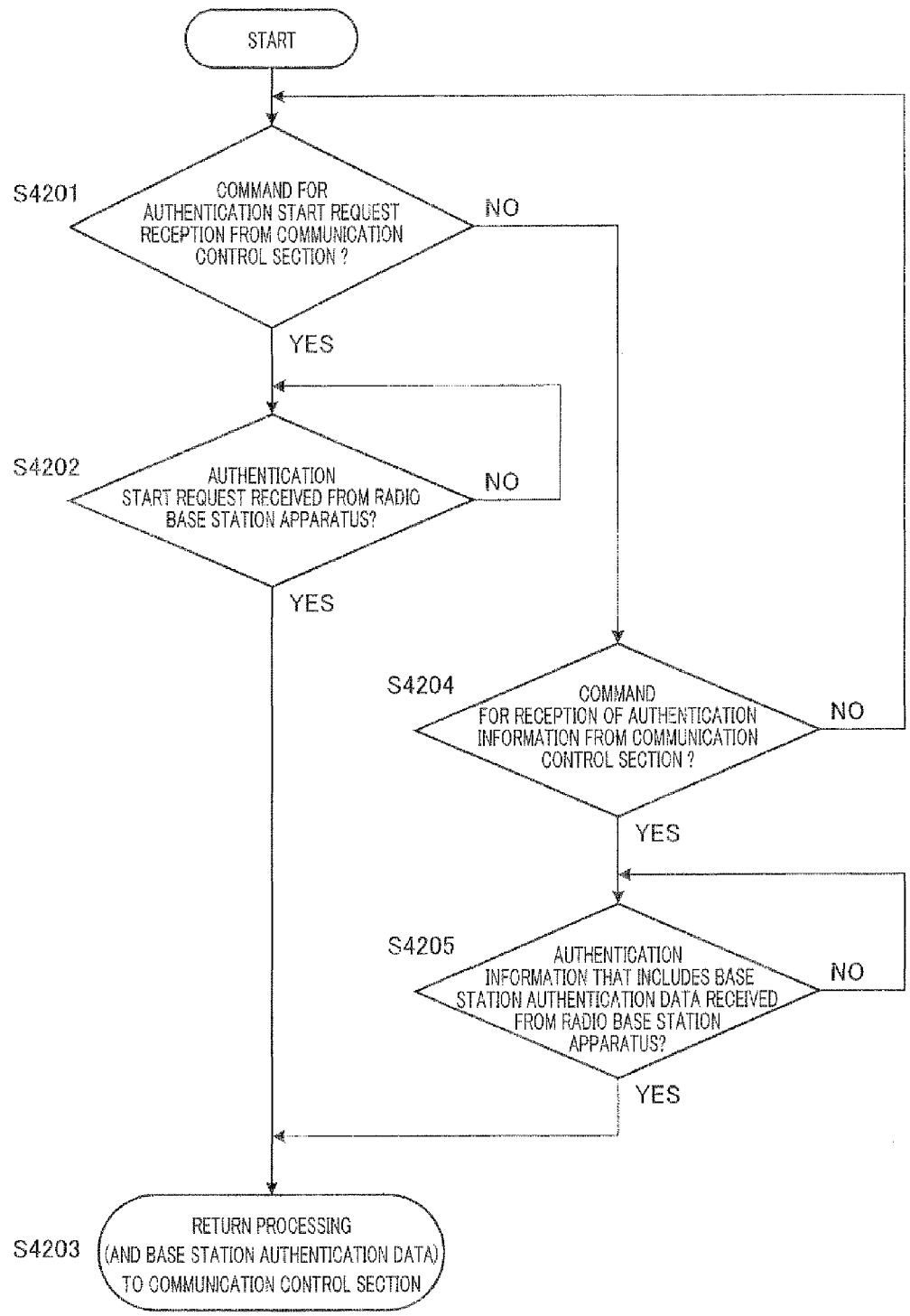
FIG. 21 is a flowchart showing an example of the operation of a reception section of a radio terminal apparatus according to Embodiment 1.

FIG. 21 is a flowchart showing an example of the operation of reception section 320 of radio terminal apparatus 300.

Reception section 320 receives a command for authentication start request reception from communication control section 310, and waits for authentication start request reception each time a command is received (S4201: YES). Then, when an authentication start request is received from radio base station apparatus 200 (S4202: YES), reception section 320 returns processing to communication control section 310.

Reception section 320 also receives a command for reception of authentication information that includes base station authentication data from communication control section 310, and waits for authentication information reception each time a command is received (S4204: YES). Then, when authentication information that includes base station authentication data is received from radio base station apparatus 200 (S4205: YES), reception section 320 passes the received base station authentication data to communication control section 310, and returns processing to communication control section 310 (S4203).

Figure 22:
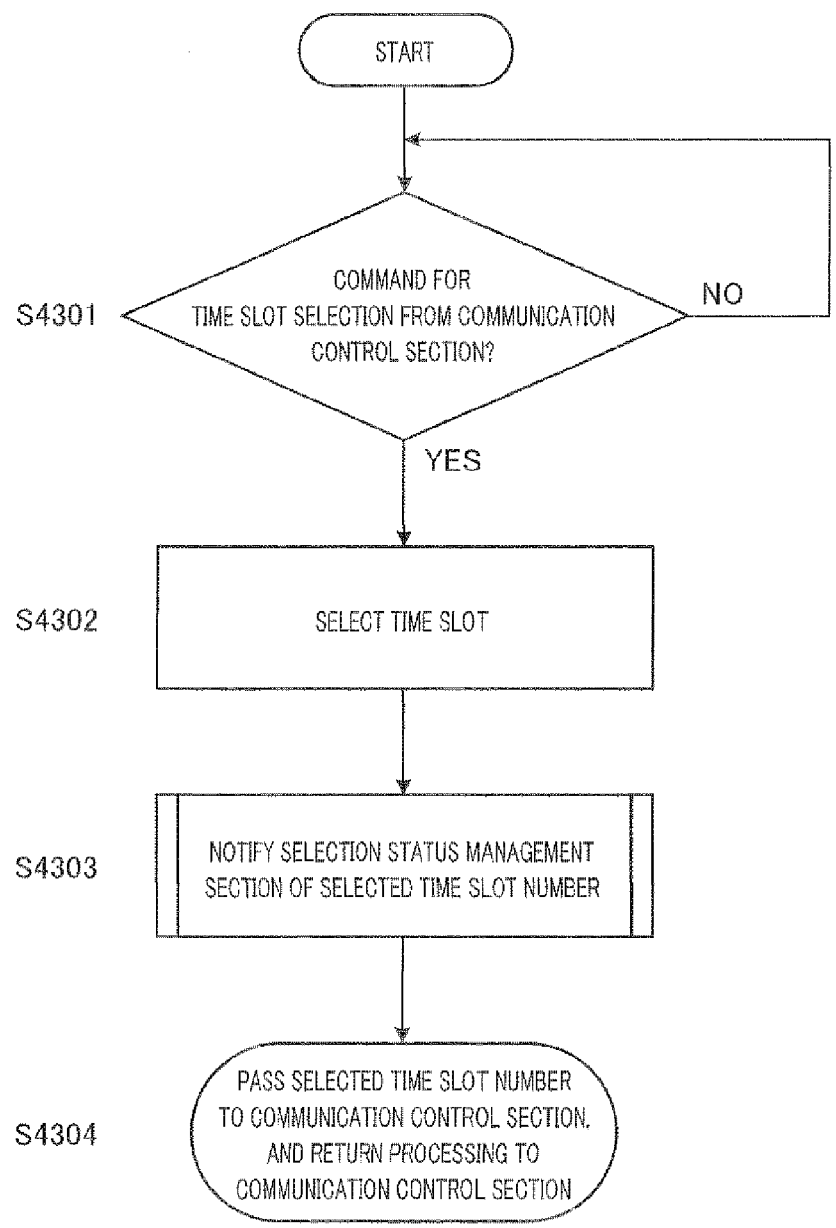
FIG. 22 is a flowchart showing an example of the operation of a time slot selection section of a radio terminal apparatus according to Embodiment 1.

FIG. 22 is a flowchart showing an example of the operation of time slot selection section 330 of radio terminal apparatus 300.

Time slot selection section 330 receives a command for time slot selection from communication control section 310. Then, each time a command is received (S4301: YES), time slot selection section 330 randomly selects at least one time slot number within a default time slot number range (S4302).

Time slot selection section 330 notifies selection status management section 340 of a selected time slot number (S4303). Then, when processing is returned together with a selected time slot number from selection status management section 340, time slot selection section 330 passes that time slot number to communication control section 310, and returns processing to communication control section 310 (S4304).

Figure 23:
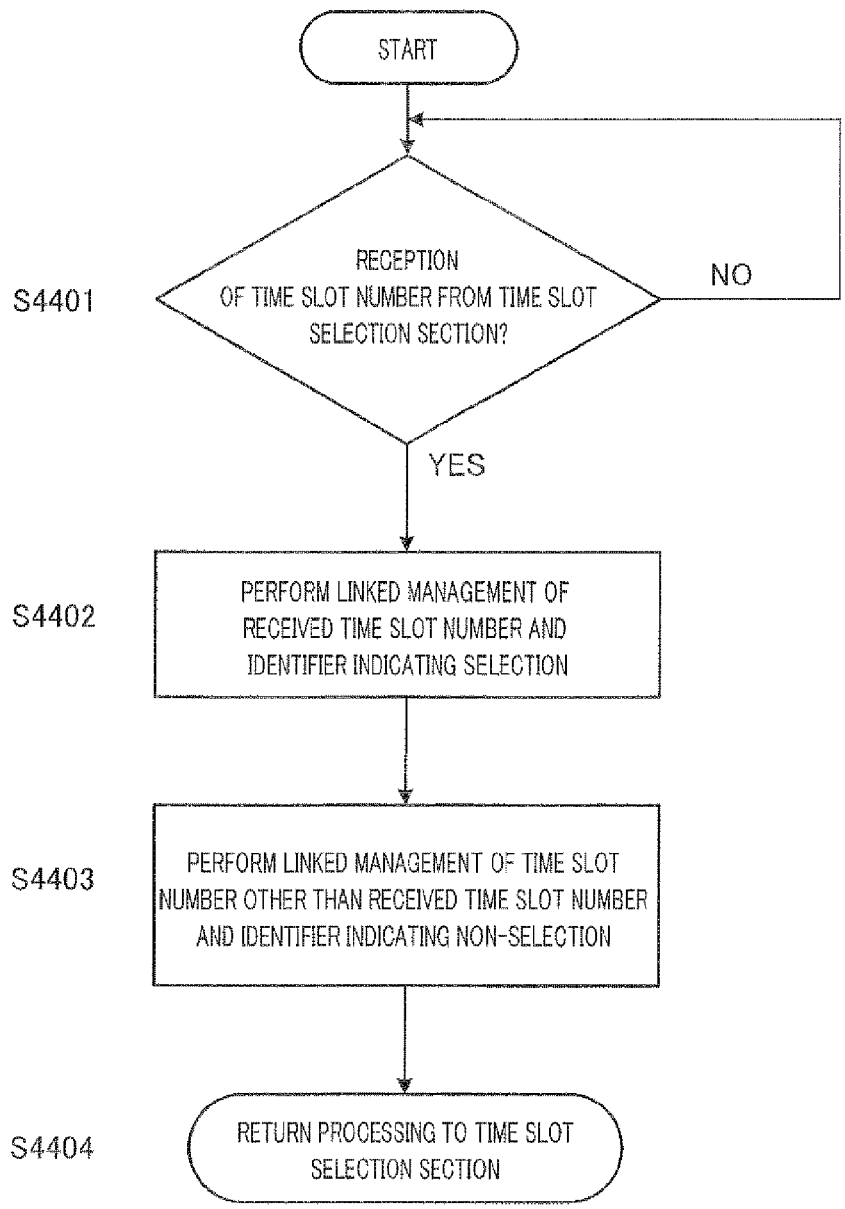
FIG. 23 is a flowchart showing an example of the operation of a selection status management section of a radio terminal apparatus according to Embodiment 1.

FIG. 23 is a flowchart showing an example of the operation of selection status management section 340 of radio terminal apparatus 300.

Selection status management section 340 receives a time slot number from time slot selection section 330. Next, each time a time slot number is received (S4401: YES), selection status management section 340 manages a selection status that links a received time slot number to an identifier indicating that selection has been performed (S4402). Then selection status management section 340 manages a selection status that links a time slot number other than a received time slot number to an identifier indicating that selection has not been performed (S4403), and returns processing to time slot selection section 330 (S4404).

Figure 24:
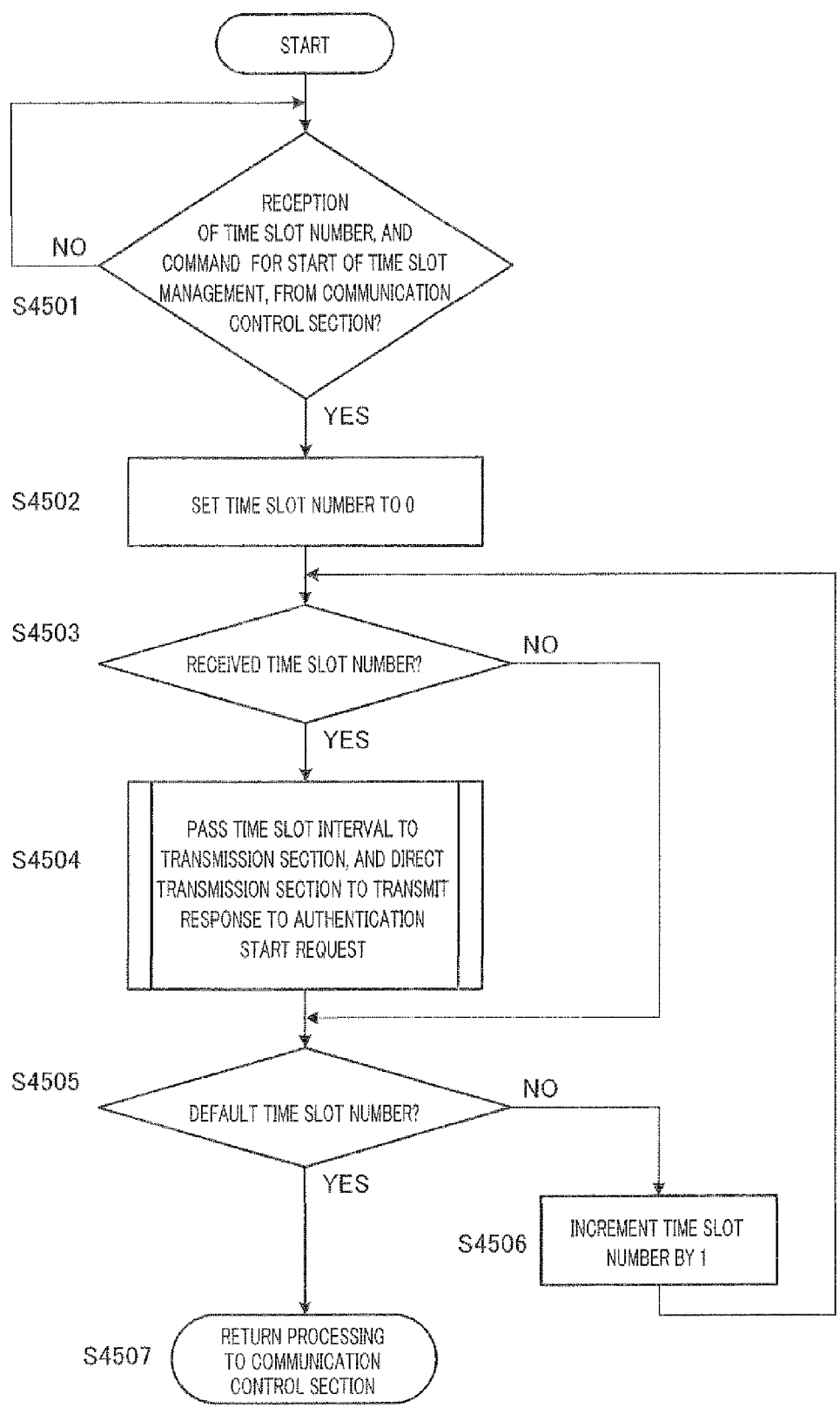
FIG. 24 is a flowchart showing an example of the operation of a time slot management section of a radio terminal apparatus according to Embodiment 1.

FIG. 24 is a flowchart showing an example of the operation of time slot management section 350 of radio terminal apparatus 300.

Time slot management section 350 receives a time slot number and a time slot management start command from communication control section 310. Then, each time a time slot number and a time slot management start command are received (S4501: YES), time slot management section 350 performs time slot management (S4502 through S4506).

More specifically, time slot management section 350 first sets the time slot number to initial value "0" (S4502). Next, time slot management section 350 increments the time slot number until the time slot number reaches a default time slot number, based on a default time slot interval (S4506). During this time, time slot management section 350 determines whether or not an incremented time slot number matches a time slot number received from communication control section 310.

If these time slot numbers match (S4503: YES), time slot management section 350 passes the default time slot interval to transmission section 360, and directs transmission section 360 to transmit a response to an authentication start request (S4504). Then, if an incremented time slot number has reached the default time slot number (S4505: YES), time slot management section 350 returns processing to communication control section 310 (S4507).

Figure 25:
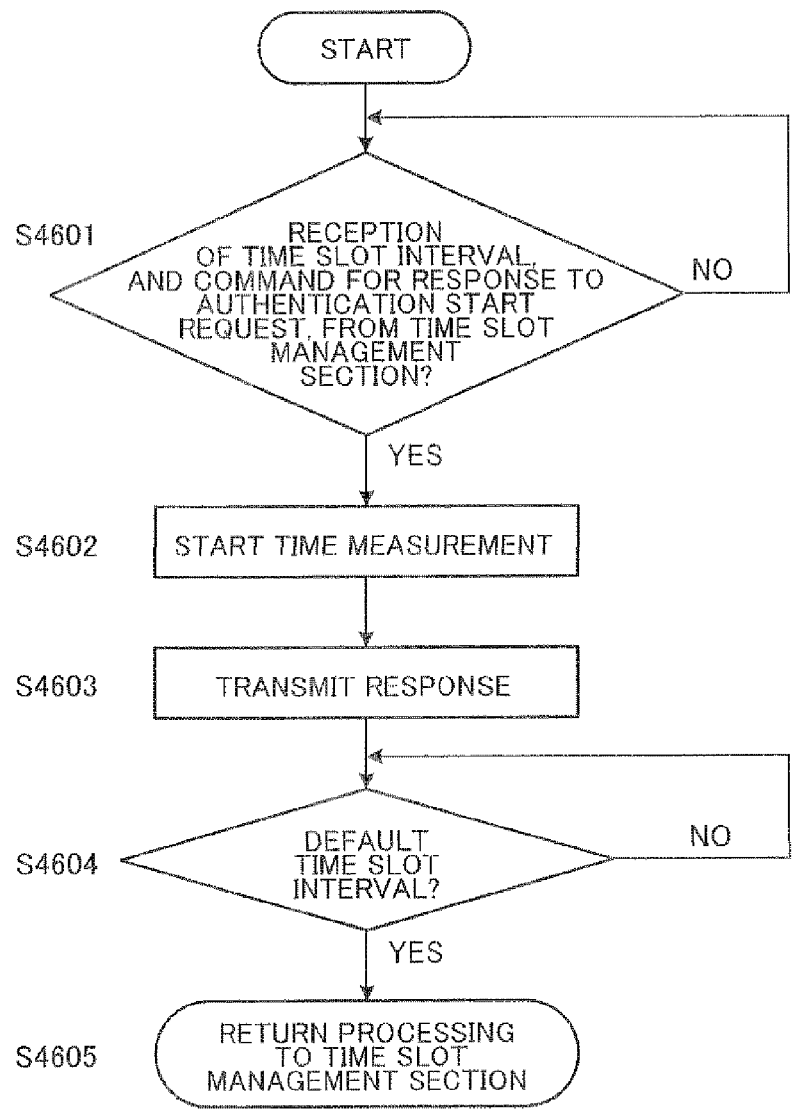
FIG. 25 is a flowchart showing an example of the operation of a transmission section of a radio terminal apparatus according to Embodiment 1.

FIG. 25 is a flowchart showing an example of the operation of transmission section 360 of radio terminal apparatus 300.

Transmission section 360 receives a time slot interval, and a command to transmit a response to an authentication start request, from time slot management section 350. Next, each time a command is received (S4601: YES), transmission section 360 generates and transmits a response to an authentication start request within a specified time slot interval (S4602, S4603).

More specifically, transmission section 360 first starts time measurement (S4602), and transmits a response to radio base station apparatus 200 (S4603). Next, when a specified time slot interval has elapsed since the start of measurement (S4604: YES), transmission section 360 returns processing to time slot management section 350 (S4605).

Figure 26:
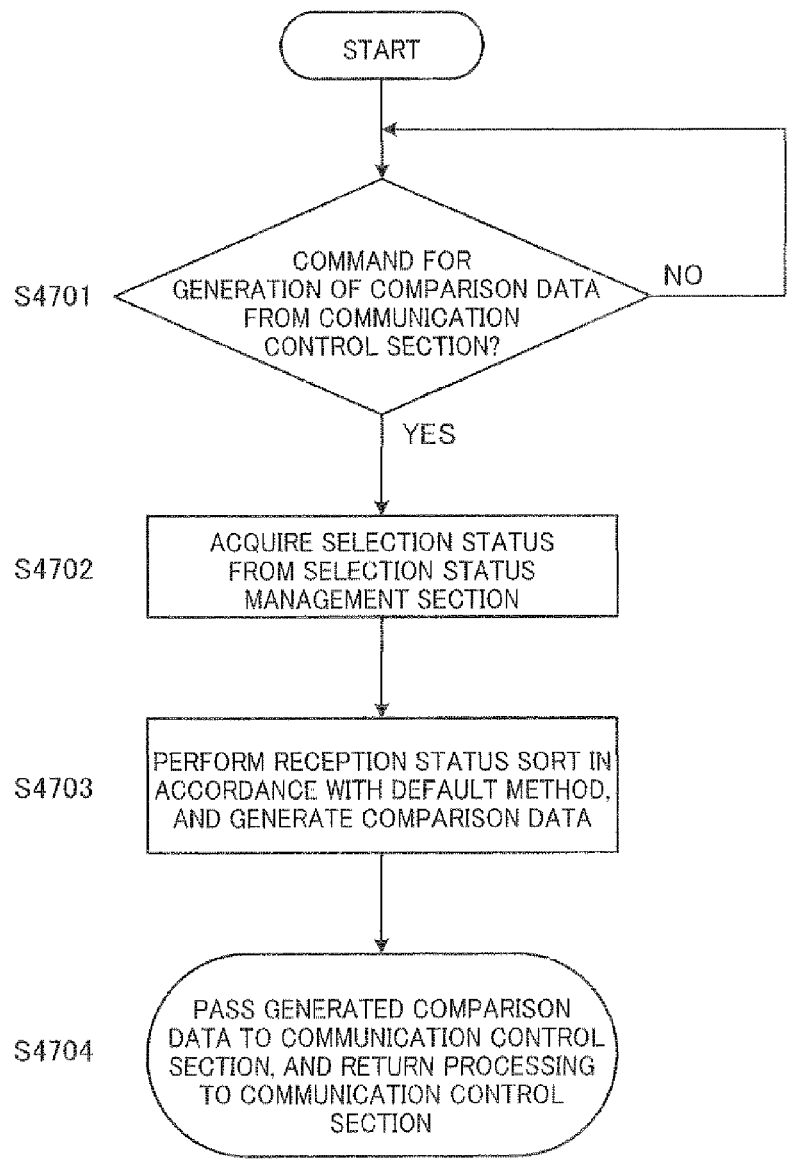
FIG. 26 is a flowchart showing an example of the operation of a comparison data generation section of a radio terminal apparatus according to Embodiment 1.

FIG. 26 is a flowchart showing an example of the operation of comparison data generation section 370 of radio terminal apparatus 300.

Comparison data generation section 370 receives a command to generate comparison data from communication control section 310. Then, each time a comparison data generation command is received (S4701: YES), comparison data generation section 370 acquires a selection status from selection status management section 340 (S4702).

Then comparison data generation section 370 generates comparison data in accordance with a default data generation rule (S4703). Comparison data generation section 370 then passes generated comparison data to communication processing section 1107, and returns processing to communication control section 310 (S4704). Here, it is assumed that comparison data generation section 370 generates comparison data according to the data generation rule illustrated in FIG. 9. That is to say, comparison data generation section 370 generates comparison data by sorting information corresponding to each time slot number in a selection status into ascending time slot number order.

Figure 27:
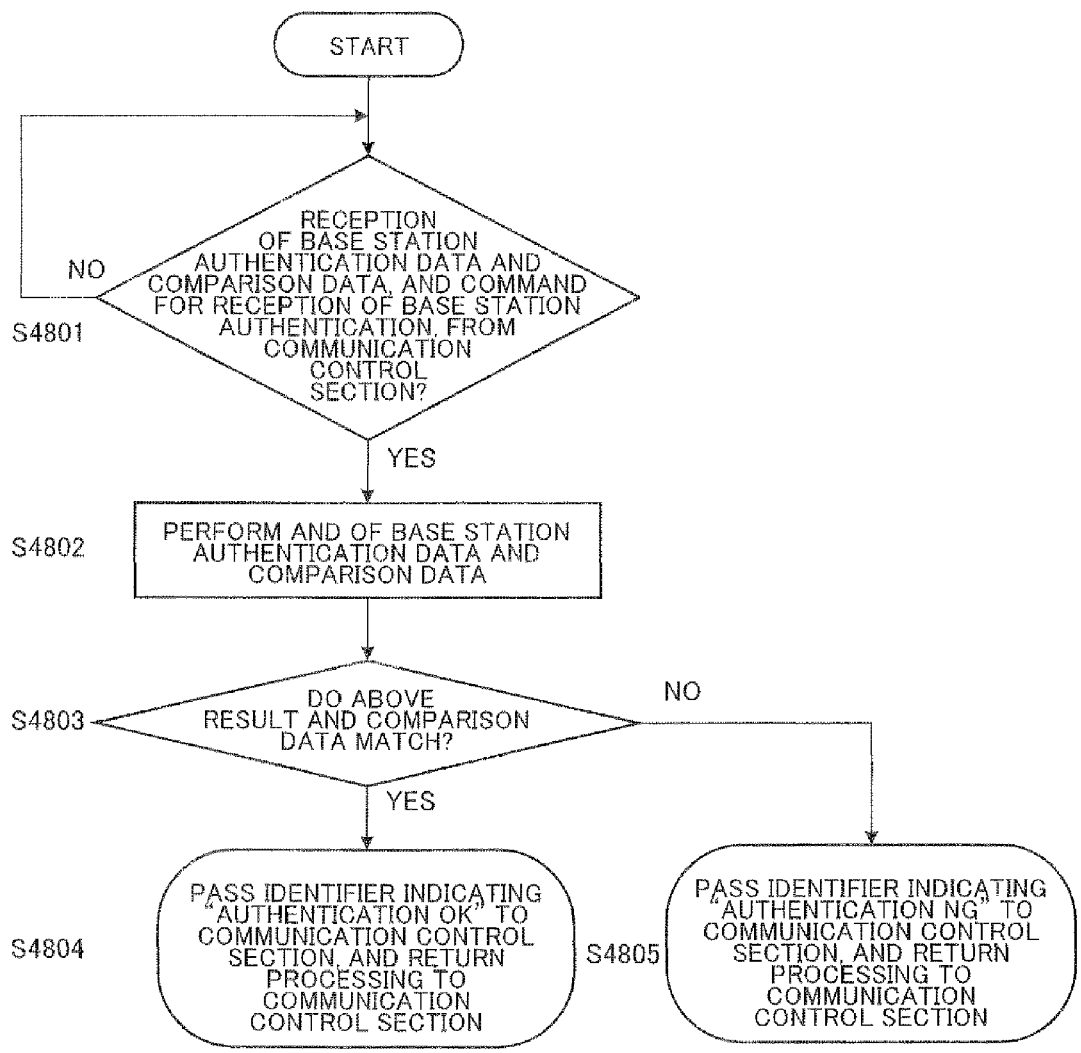
FIG. 27 is a flowchart showing an example of the operation of a base station authentication section of a radio terminal apparatus according to Embodiment 1.

FIG. 27 is a flowchart showing an example of the operation of base station authentication section 380 of radio terminal apparatus 300.

Base station authentication section 380 receives base station authentication data and comparison data, and a base station authentication command, from communication control section 310. Then, each time a base station authentication command is received (S4801: YES), base station authentication section 380 calculates the AND of base station authentication data and comparison data (S4802). Base station authentication section 380 determines whether or not the calculation result matches the comparison data. Base station authentication section 380 may also determine whether or not values match (both are "1") at a bit position at which the value is "1" in a bit pattern of base station authentication data and a corresponding bit position of a base station authentication data bit pattern.

If a calculation result and comparison data match (S4803: YES), base station authentication section 380 determines that received base station authentication data is not from a replay attack. Then base station authentication section 380 passes an identifier indicating "authentication OK" to communication control section 310, and returns processing to communication control section 310 (S4804).

On the other hand, if a calculation result and comparison data do not match (S4803: NO), base station authentication section 380 determines that received base station authentication data is from a replay attack. Then base station authentication section 380 passes an identifier indicating "authentication NG" to communication control section 310, and returns processing to communication control section 310 (S4805).

Radio base station apparatus 200 operation, radio terminal apparatus 300 operation, and radio communication system 100 operation as illustrated in FIG. 5 through FIG. 11 is implemented by means of the above kinds of operation by the respective sections.

As described above, radio communication system 100 according to this embodiment enables generation and utilization of effective shared base station authentication data relating to defense against replay attacks in a plurality of radio terminal apparatuses 300. Therefore, radio communication system 100 according to this embodiment enables the number of times base station authentication data is generated, and the number of times a signature is added to base station authentication data, to be decreased. In addition, radio communication system 100 according to this embodiment enables the number of base station authentication data transmissions to be decreased by performing broadcast transmission.

Therefore, radio communication system 100 according to this embodiment enables previously necessary base station authentication data computation time and transmission time per radio terminal apparatus 300 to be reduced while enabling replay attacks to be rejected by individual radio terminal apparatuses 300. By this means, radio communication system 100 according to this embodiment makes it possible for shortening of the time slot length to be achieved, and for more radio terminal apparatuses 300 to perform base station authentication within a fixed period of time.

Also, radio communication system 100 according to this embodiment uses a combination of varying information comprising "a time slot selected by each radio terminal apparatus 300" and "a number of selected time slots" in base station authentication data generation. By this means, even if a third party attempts a replay attack using base station authentication data previously transmitted from radio base station apparatus 200, that base station authentication data will not match current comparison data. Therefore, radio communication system 100 according to this embodiment enables authentication security to be improved.

The number of radio terminal apparatuses 300 subject to one base station authentication data generation operation is not limited to the above number. Also, data generation rules for base station authentication data and comparison data are not limited to the above-described contents, and contents arranged in descending time slot number order, or functions that perform various other kinds of sorting on time slot numbers, can be employed.

Base station authentication data creation and comparison data creation need not be performed in frame units, but may be performed using some of the plurality of time slots configuring a frame as a unit. That is to say, default time slot number n may be smaller than the number of time slots of a frame whereby a response to an authentication start request is implemented. In this case, a plurality of base station authentication data are generated and transmitted for one frame. By this means, the generation time, transmission time, and comparison time of each data can be further shortened by means of the base station authentication data and comparison data generation rules.

Embodiment 2

Embodiment 2 of the present invention improves the randomness of base station authentication data and comparison data by adding a random value generated by a radio terminal apparatus to a response to an authentication start request, and using this random value in base station authentication data and comparison data generation.

Figure 28:
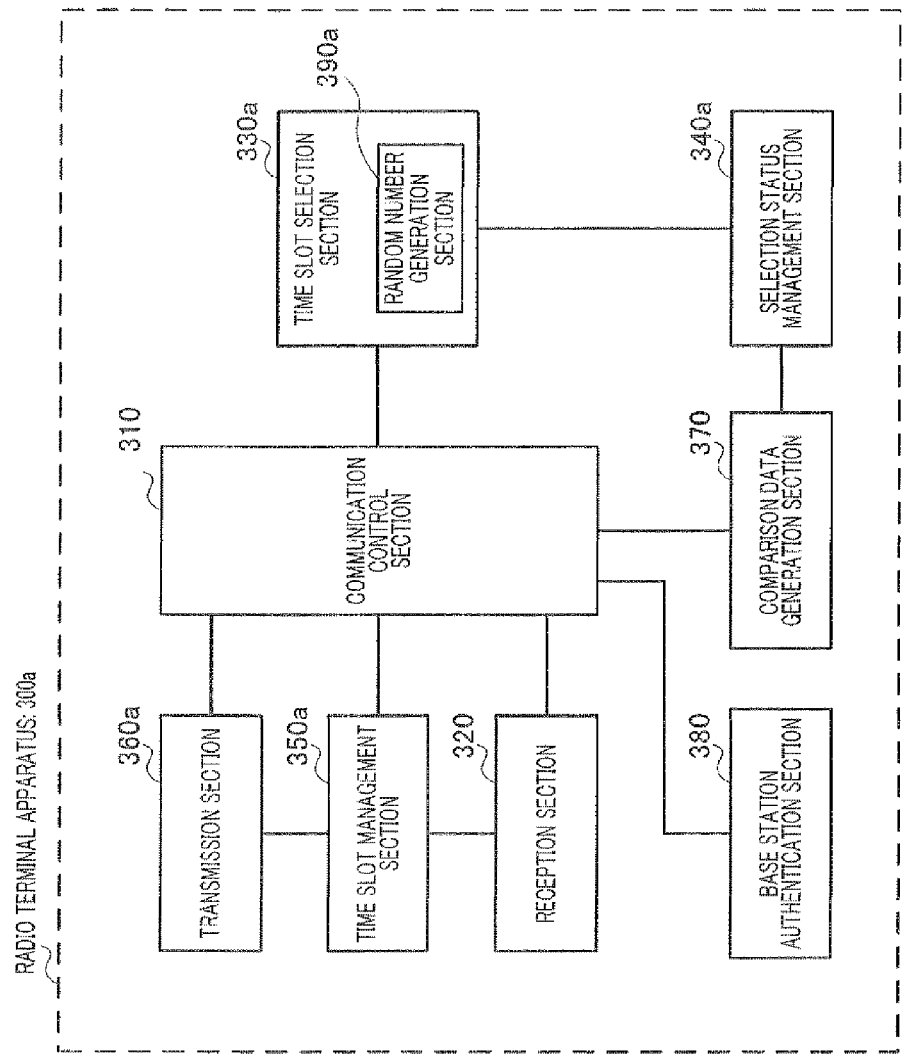
FIG. 28 is a block diagram showing an example of the configuration of a radio base station apparatus according to Embodiment 2 of the present invention.

FIG. 28 is a block diagram showing an example of the configuration of radio terminal apparatus 300a according to this embodiment, and corresponds to FIG. 13 of Embodiment 1. Parts in FIG. 28 identical to or corresponding to parts in FIG. 13 are assigned the same reference codes as in FIG. 13, and descriptions thereof are omitted here.

In FIG. 28, radio terminal apparatus 300a has time slot selection section 330a, selection status management section 340a, time slot management section 350a, and transmission section 360a, differing from the configuration in FIG. 13. Furthermore, radio terminal apparatus 300a has random number generation section 390a as a new addition. Random number generation section 390a is located in time slot selection section 330a, for example.

Random number generation section 390a generates a random number using a known pseudo-random number generation method, for example. Random number generation section 390a generates a random value that is other than "0", which is an identifier indicating non-reception and non-selection, and that is within a size range allowing embedding in a response.

Time slot selection section 330a generates a random value for each selected time slot, using random number generation section 390a. Then time slot selection section 330a passes a generated random value to selection status management section 340a and communication control section 310.

On receiving a random value from time slot selection section 330a, selection status management section 340a manages a selection status that links a time slot number to a random value.

On receiving a random value from time slot selection section 330a, time slot management section 350a directs transmission section 360a to transmit a response in which the random value is embedded as a response.

Transmission section 360a receives a response transmission command and random value from time slot management section 350a. Then transmission section 360a generates a response in which the received random value is embedded, and transmits this as a response to an authentication start request, using a selected slot.

Figure 29:
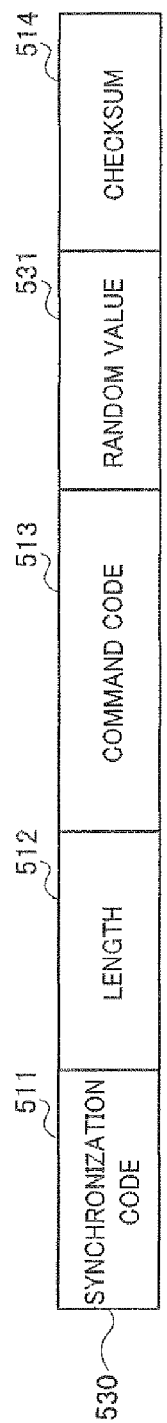
FIG. 29 is a drawing showing an example of the data configuration of a response in which a random value is embedded in Embodiment 2.

FIG. 29 is a drawing showing an example of the data configuration of a response in which a random value is embedded, and corresponds to FIG. 6 of Embodiment 1. Parts in FIG. 29 identical to those in FIG. 6 are assigned the same reference codes as in FIG. 6.

As shown in FIG. 29, radio data 530 of a response in which a random value is embedded comprises synchronization code 511, length 512, command code 513, random value 531, and checksum 514, arranged in that order. Here, length 512 contains the total length of command code 513, random value 531, and checksum 51.

In command code 513, radio terminal apparatus 300 enters a predetermined command code indicating that radio data 530 is a response and stores a random number. Also, radio terminal apparatus 300 enters a generated random value in random value 531, and generates radio data 530 of a response in which a random value is embedded. When the above predetermined command code has been entered in command code 513, radio base station apparatus 200 determines that that radio data 510 is a response, and extracts random value 531.

Such a radio terminal apparatus 300a can transmit a generated random value to radio base station apparatus 200a as a response, and generate data in which a random value and an identifier indicating non-reception are arranged in ascending time slot number order as comparison data. Then radio terminal apparatus 300a can perform base station authentication based on whether or not a selected random value is associated with a selected time slot number in base station authentication data sent from radio base station apparatus 200a.

Figure 30:
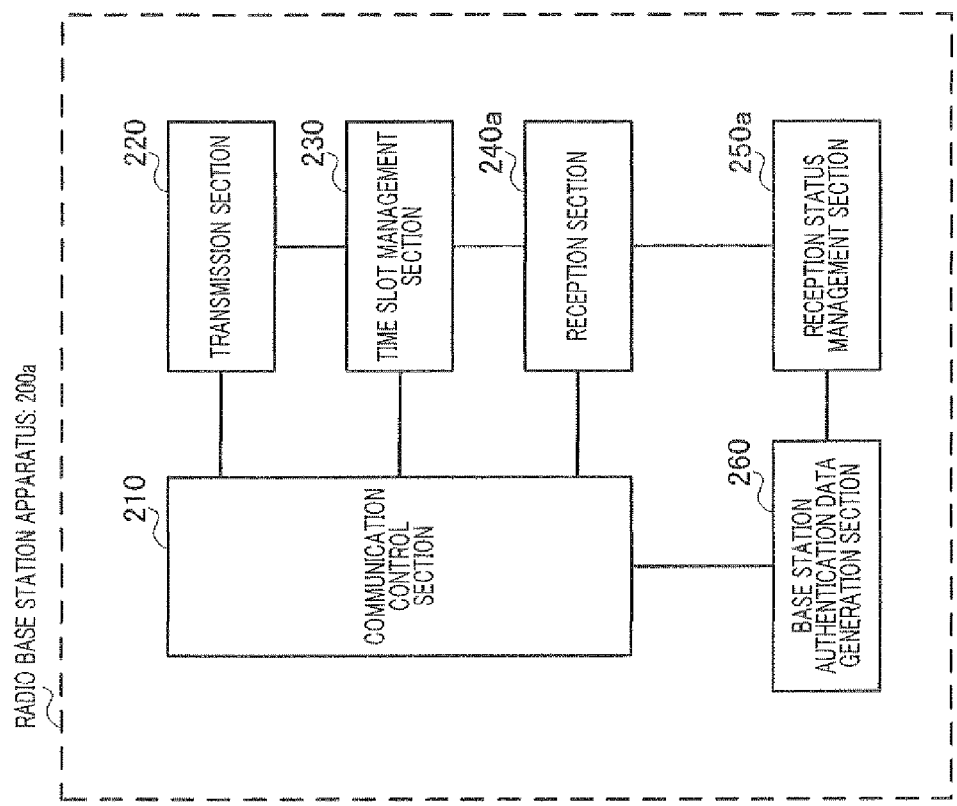
FIG. 30 is a block diagram showing an example of the configuration of a radio base station apparatus according to Embodiment 2.

FIG. 30 is a block diagram showing an example of the configuration of radio base station apparatus 200a according to this embodiment, and corresponds to FIG. 12 of Embodiment 1. Parts in FIG. 30 identical to or corresponding to parts in FIG. 12 are assigned the same reference codes as in FIG. 12, and descriptions thereof are omitted here.

In FIG. 30, radio base station apparatus 200a has reception section 240a and reception status management section 250a instead of and differing from reception section 240 and reception status management section 250 shown in FIG. 12.

On receiving a response to an authentication start request, reception section 240a passes to reception status management section 250 not a reception notification but a random value embedded in an ACK message sent as a response.

On receiving a random value from reception section 240a, reception status management section 250a manages a reception status that links a time slot number to a random value.

Such a radio base station apparatus 200a can generate data in which a received random value and identifier indicating non-reception are arranged in ascending time slot number order as base station authentication data.

Areas of the operation of a radio communication system according to this embodiment that differ from Embodiment 1 will now be described. In the drawings, parts identical to or corresponding to those in a corresponding drawing of Embodiment 1 are assigned the same step numbers as in Embodiment 1, and descriptions thereof are omitted here.

Figure 31:
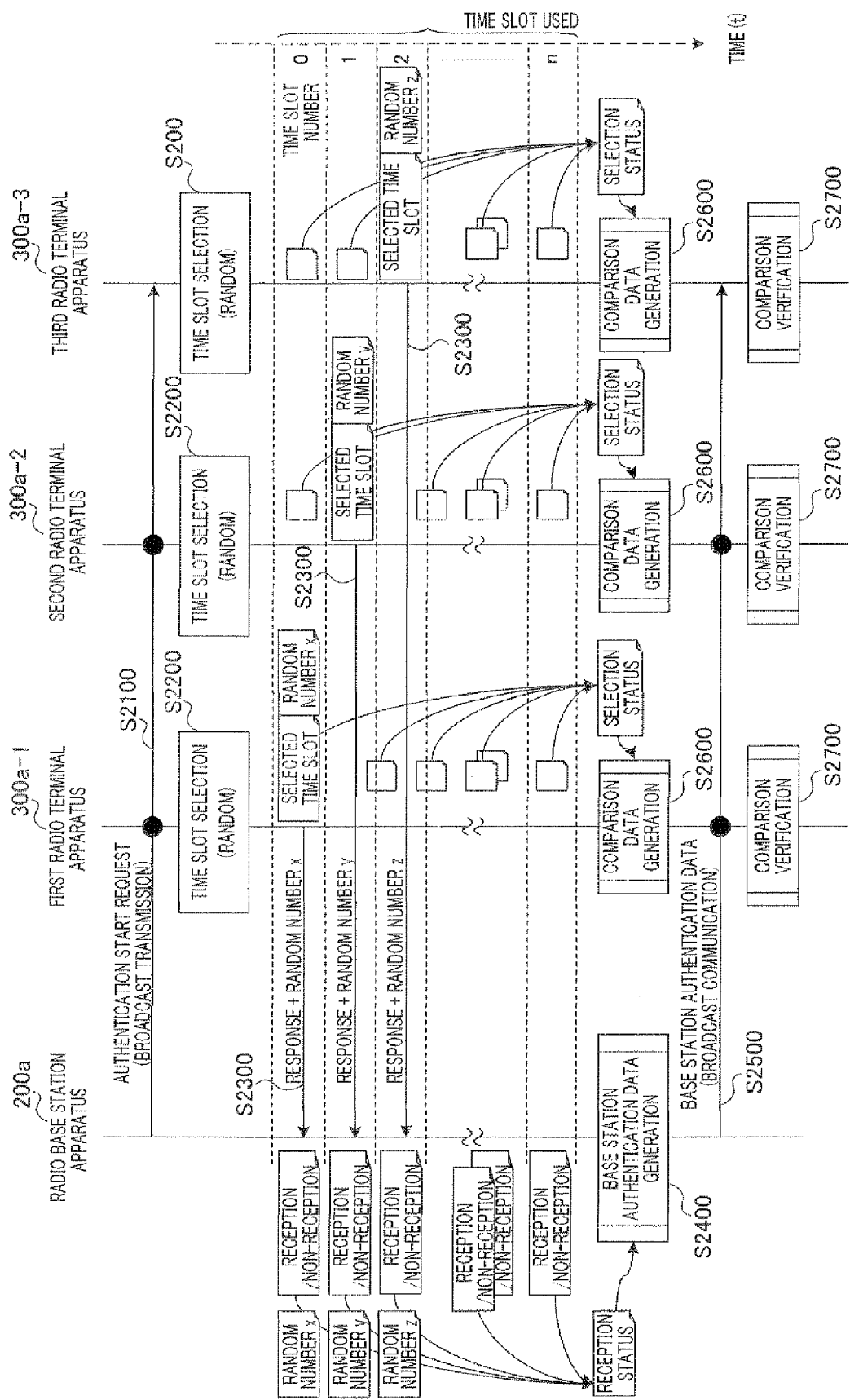
FIG. 31 is a sequence diagram showing an example of the overall operation of a radio communication system according to Embodiment 2.
Figure 32:
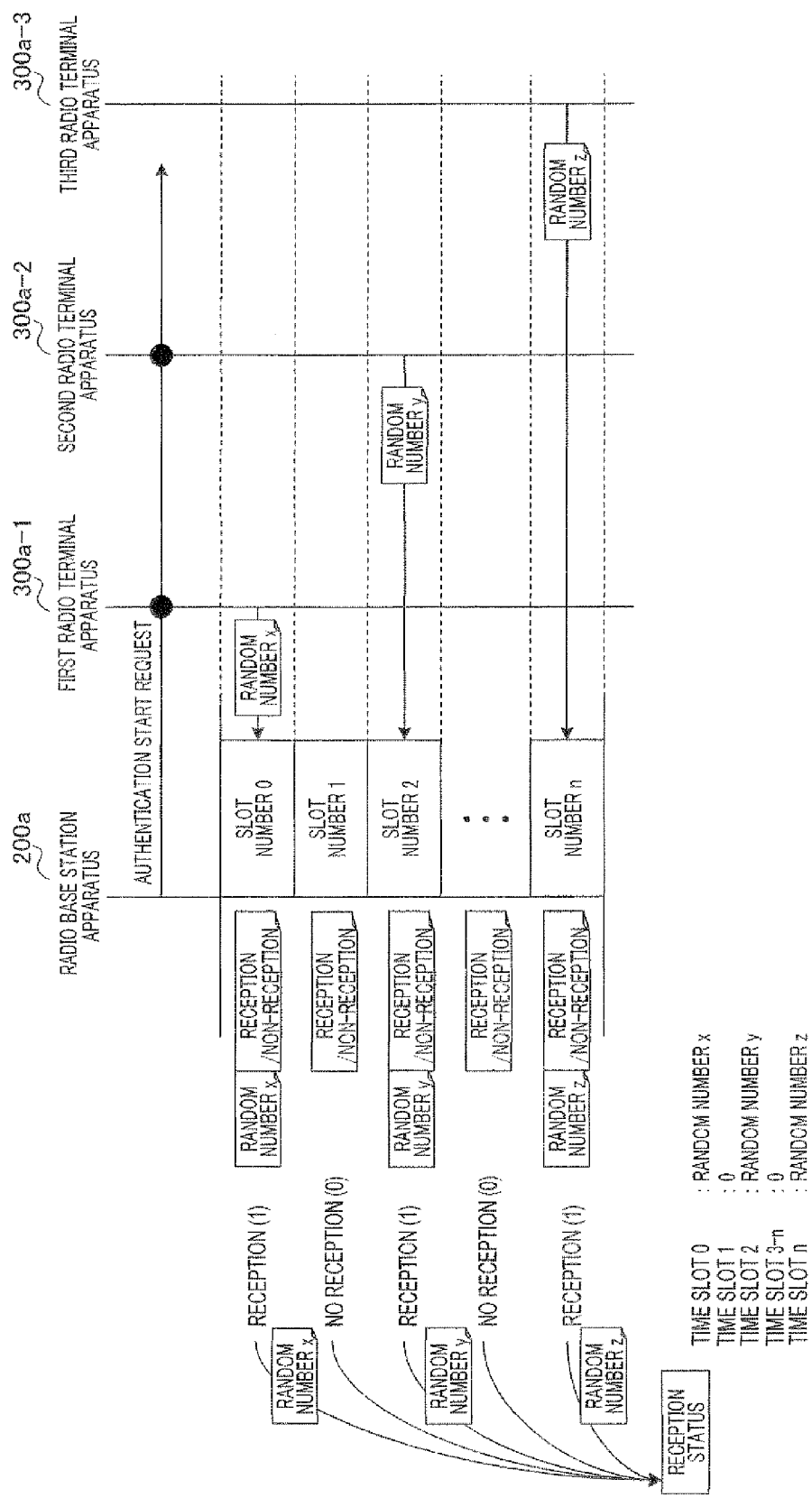
FIG. 32 is a schematic diagram showing an example of a data generation rule for base station authentication data in Embodiment 2.
Figure 33:
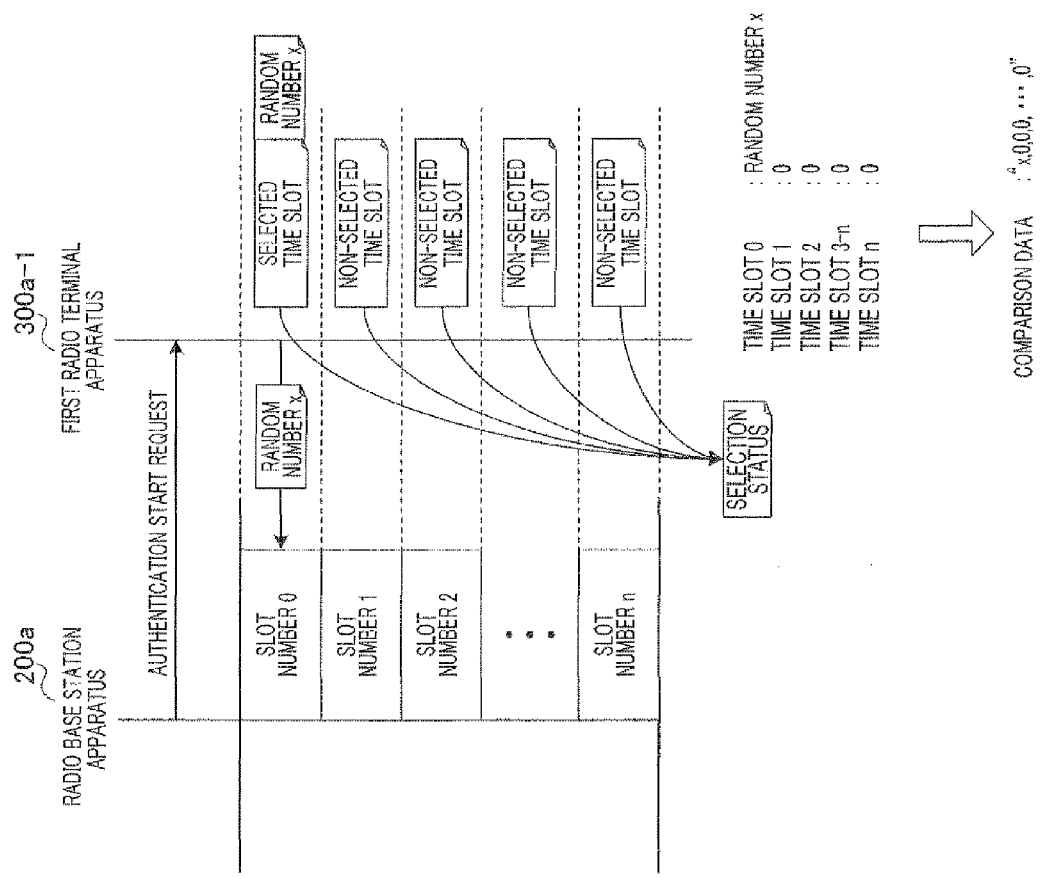
FIG. 33 is a schematic diagram showing an example of a data generation rule for comparison data used by a radio terminal apparatus in Embodiment 2.

FIG. 31 is a sequence diagram showing an example of the overall operation of a radio communication system having radio base station apparatus 200a and radio terminal apparatuses 300a, and corresponds to FIG. 5 of Embodiment 1. FIG. 32 is a schematic diagram showing an example of a data generation rule for generation of base station authentication data by radio base station apparatus 200a, and corresponds to FIG. 8 of Embodiment 1. FIG. 33 is a schematic diagram showing an example of a data generation rule for generation of comparison data by radio terminal apparatus 300a, and corresponds to FIG. 9 of Embodiment 1.

As shown in FIG. 31, each radio terminal apparatus 300a includes a generated random value in a response to radio base station apparatus 200a and a selection status. Also, radio base station apparatus 200a manages a reception status that includes a received random number. As a result, as shown in FIG. 32 and FIG. 33, in this embodiment a random value is entered in a part of base station authentication data and comparison data in which an identifier indicating a time slot used for base station authentication was entered in Embodiment 1.

Figure 34:
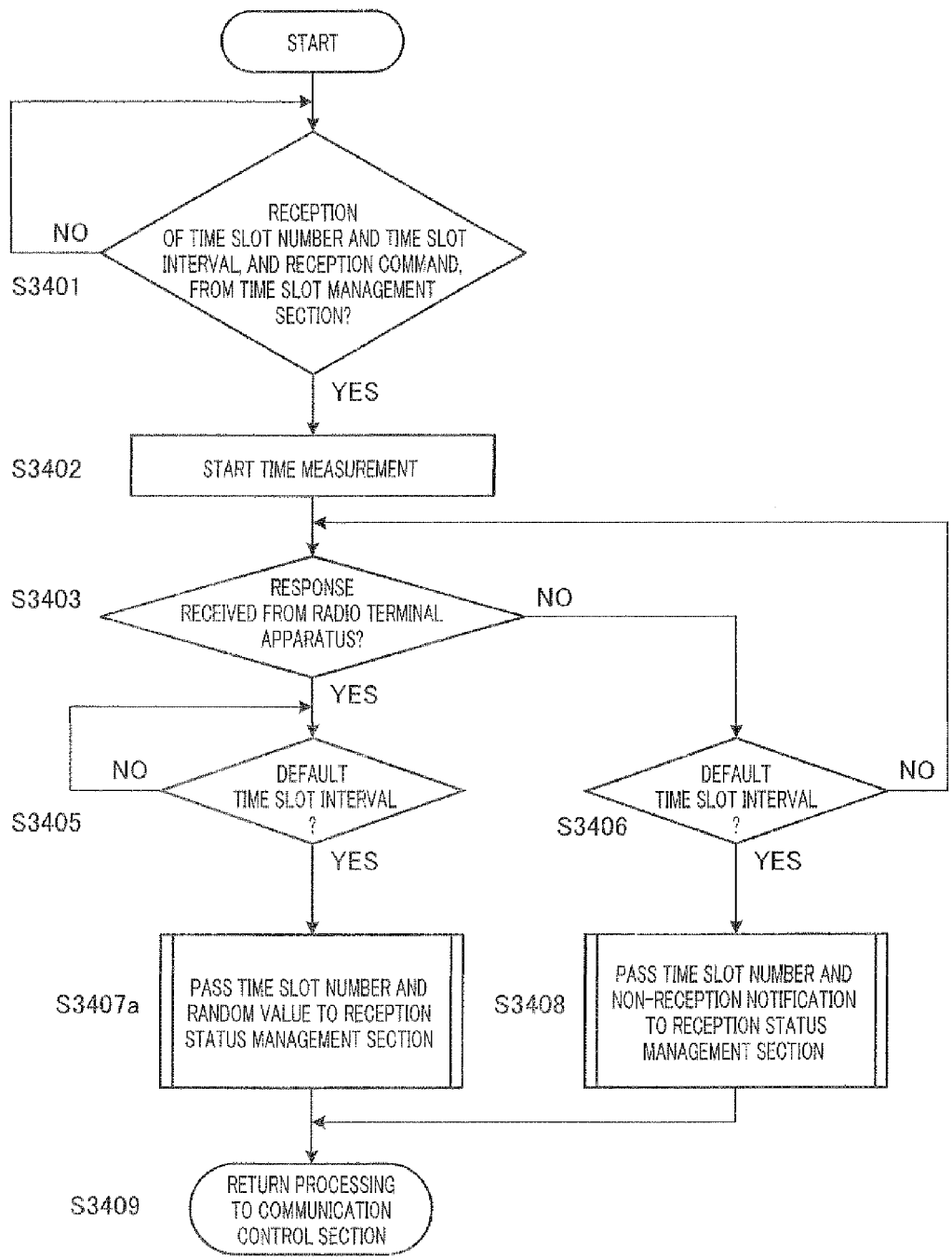
FIG. 34 is a flowchart showing an example of the operation of a reception section of a radio base station apparatus according to Embodiment 2.

FIG. 34 is a flowchart showing an example of the operation of reception section 240a of radio base station apparatus 200a, and corresponds to FIG. 17 of Embodiment 1.

On receiving a response from radio terminal apparatus 300a (S3403: YES, S3405: YES), reception section 240a passes a time slot number and a random value included in the response to reception status management section 250a (S3407a).

Figure 35:
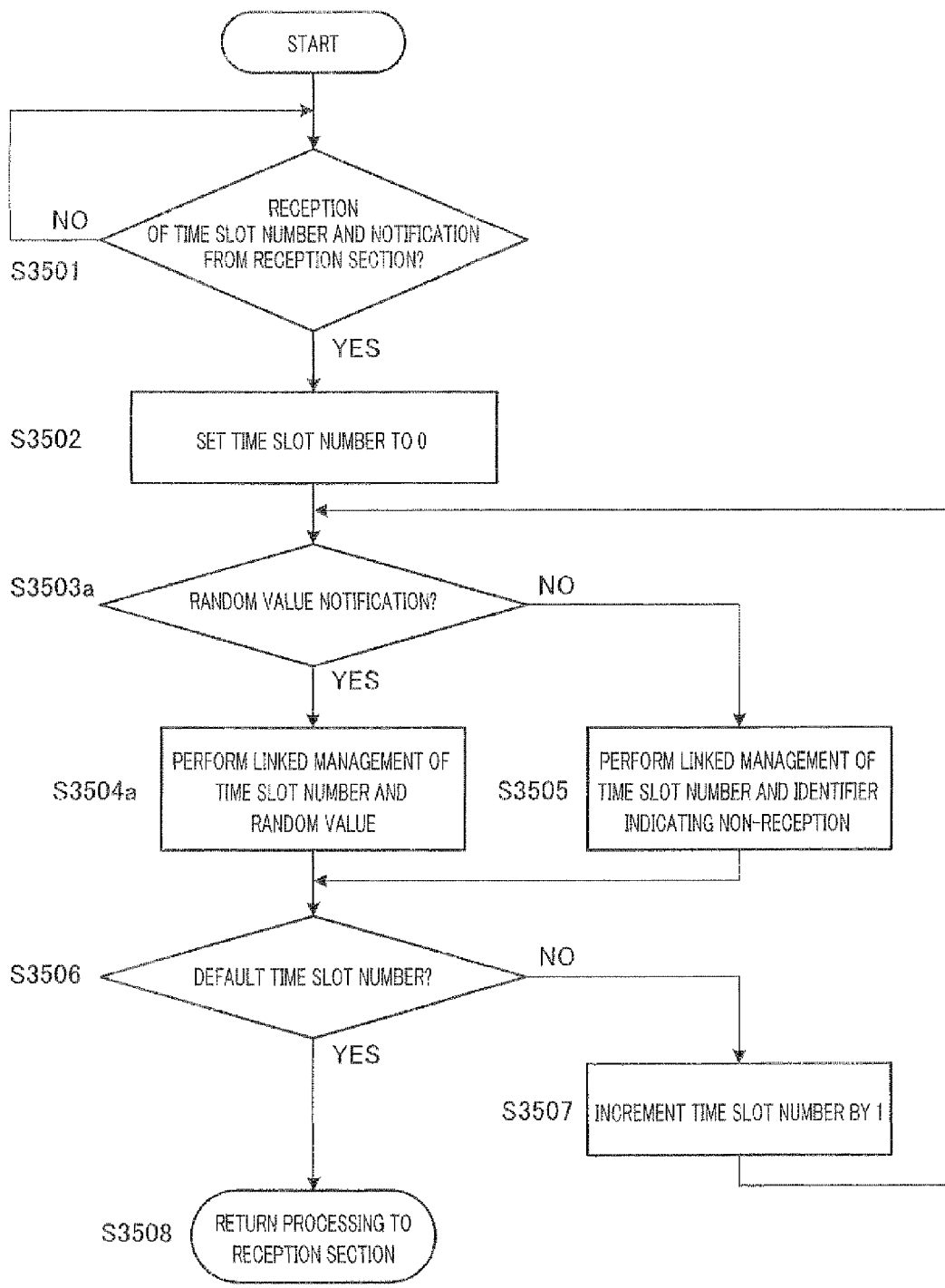
FIG. 35 is a flowchart showing an example of the operation of a reception status management section of a radio base station apparatus according to Embodiment 2.

FIG. 35 is a flowchart showing an example of the operation of reception status management section 250a of radio base station apparatus 200a, and corresponds to FIG. 18 of Embodiment 1.

For a time slot for which a random value has been reported from reception section 240a (S3503a: YES), reception status management section 250a performs linked management of the time slot number and random value (S3504a).

As a result, base station authentication data in which a random value is embedded is generated as shown in FIG. 32, and is transmitted by broadcast transmission.

Figure 36:
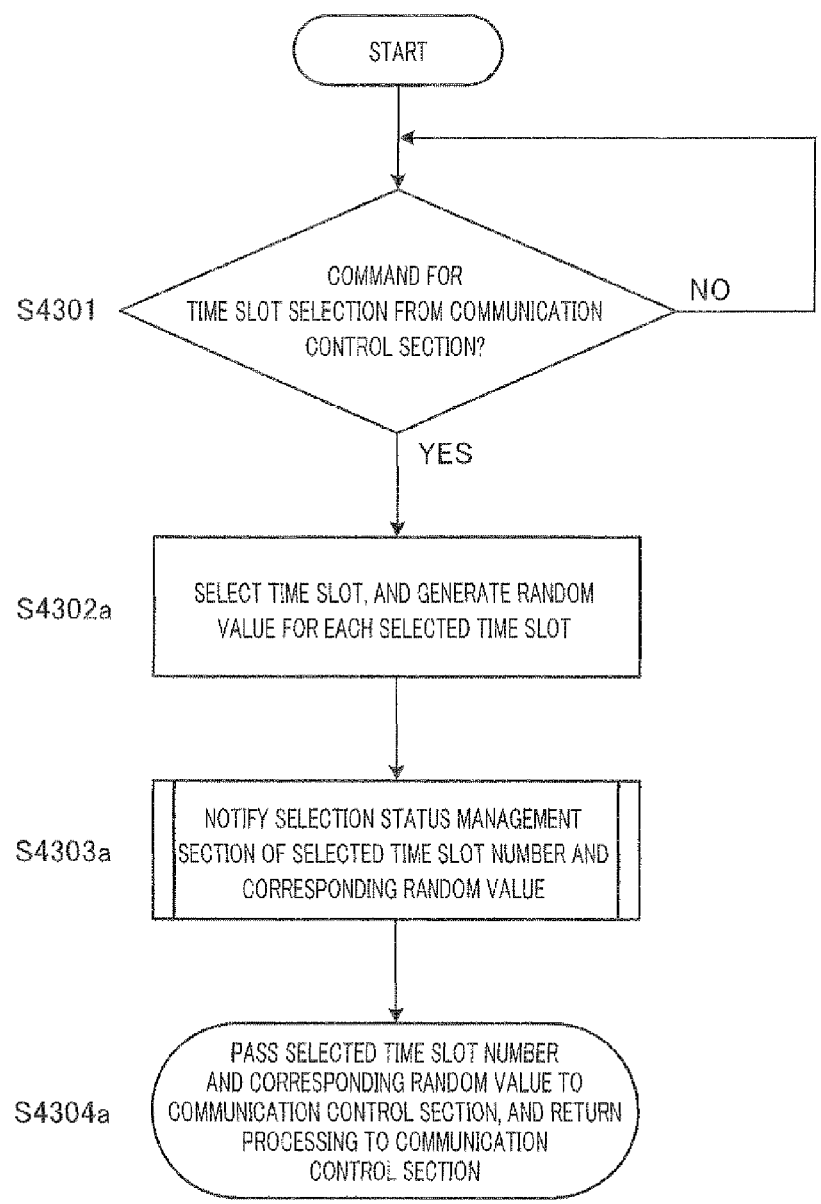
FIG. 36 is a flowchart showing an example of the operation of a time slot selection section of a radio terminal apparatus according to Embodiment 2.

FIG. 36 is a flowchart showing an example of the operation of time slot selection section 330a of radio terminal apparatus 300a, and corresponds to FIG. 22 of Embodiment 1.

Time slot selection section 330a generates a random value for each selected time slot, using random number generation section 390a (S4302a). Then time slot selection section 330a notifies selection status management section 340a of a selected time slot number and a random value corresponding to the time slot number (S4303a), and processing is returned from selection status management section 340a. Next, time slot selection section 330a passes the selected time slot number and the random value corresponding to the time slot number to communication control section 310, and returns processing to communication control section 310 (S4304a).

Figure 37:
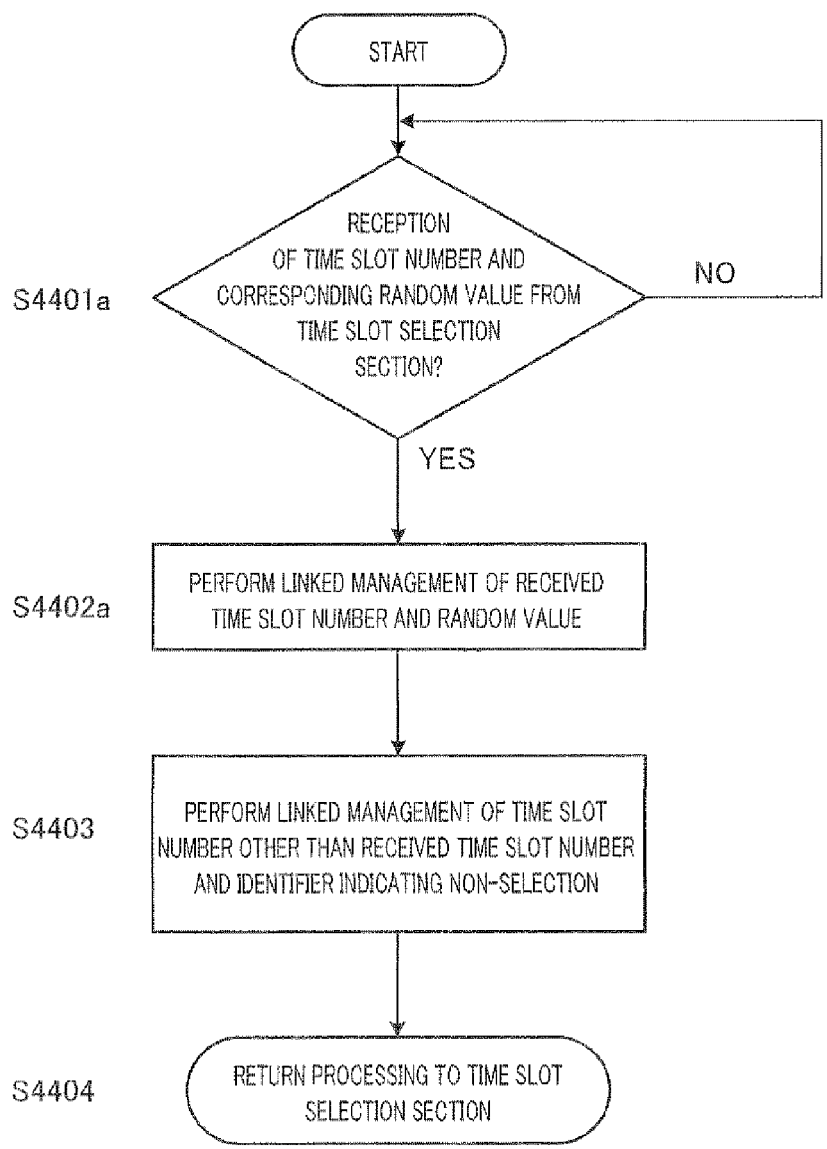
FIG. 37 is a flowchart showing an example of the operation of a selection status management section of a radio terminal apparatus according to Embodiment 2.

FIG. 37 is a flowchart showing an example of the operation of selection status management section 340a of radio terminal apparatus 300a, and corresponds to FIG. 23 of Embodiment 1.

Selection status management section 340a receives a time slot number and the random value corresponding to the time slot number from time slot selection section 330a (S4401a: YES). Next, selection status management section 340a manages a selection status that links a received time slot number and random value (S4402a).

Figure 38:
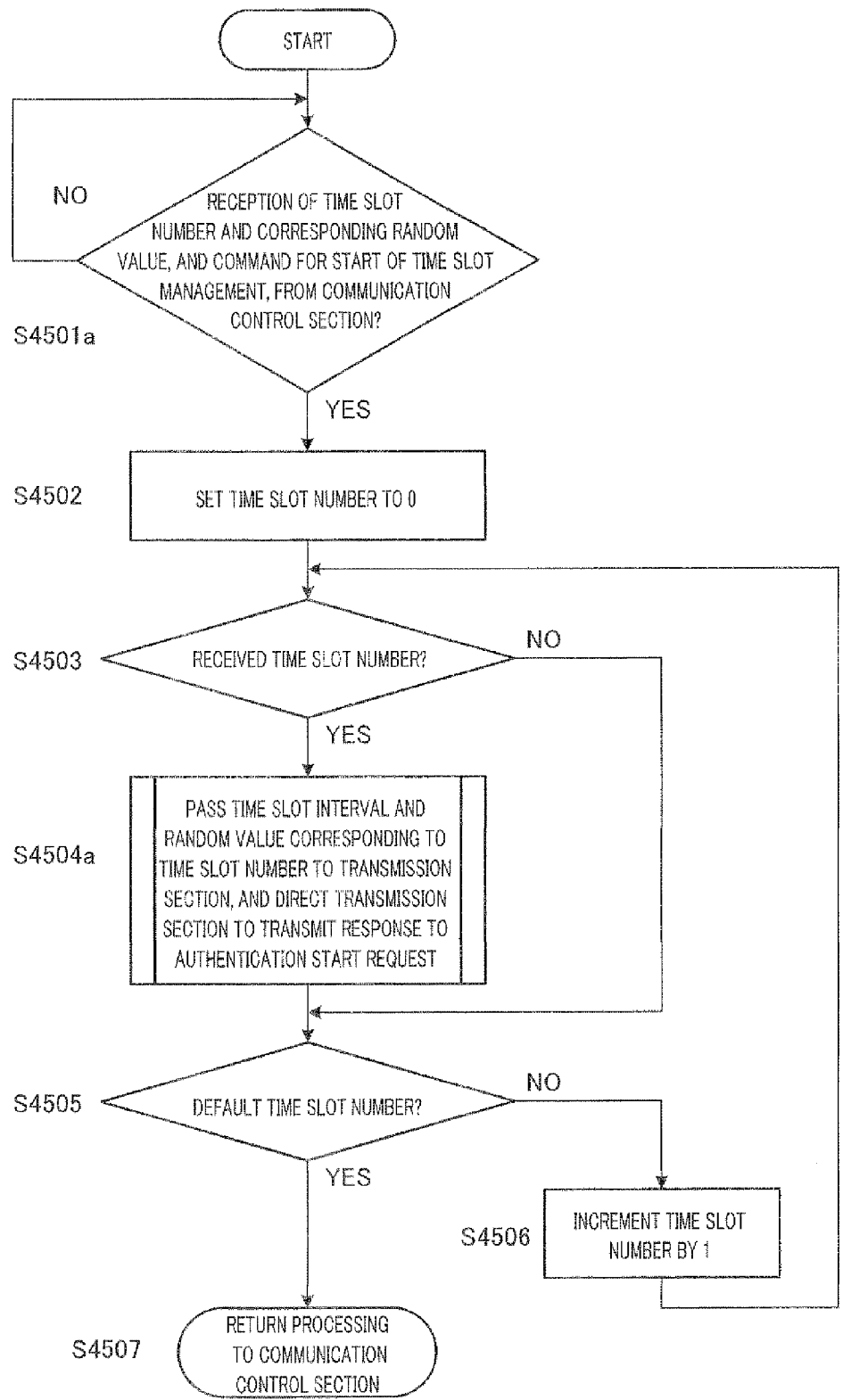
FIG. 38 is a flowchart showing an example of the operation of a time slot management section of a radio terminal apparatus according to Embodiment 2.

FIG. 38 is a flowchart showing an example of the operation of time slot management section 350a of radio terminal apparatus 300a, and corresponds to FIG. 24 of Embodiment 1.

Time slot management section 350a receives a time slot number and a random value corresponding to the time slot number from communication control section 310, and is directed to start time slot management (S4501a: YES). Next, time slot management section 350a starts time slot number incrementing. Then, when a time slot with the received time slot number arrives (S4503: YES), time slot management section 350a passes the time slot interval and random value corresponding to the time slot number to transmission section 360a. Then time slot management section 350a gives a command for a response to an authentication start request (S4504a).

Figure 39:
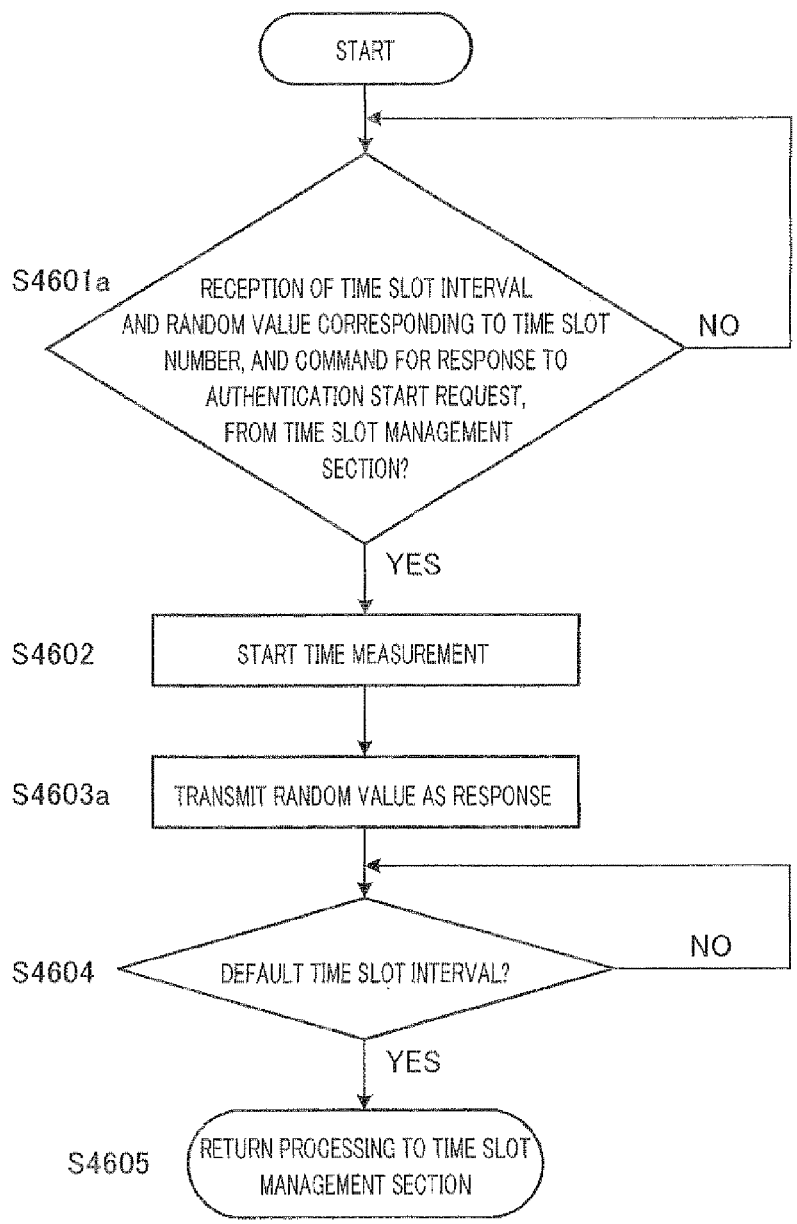
FIG. 39 is a flowchart showing an example of the operation of a transmission section of a radio terminal apparatus according to Embodiment 2.

FIG. 39 is a flowchart showing an example of the operation of transmission section 360a of radio terminal apparatus 300a, and corresponds to FIG. 25 of Embodiment 1.

Transmission section 360a receives the time slot interval and a random value corresponding to the time slot from time slot management section 350a (S4601a: YES). Next, transmission section 360a transmits the received random value to radio base station apparatus 200a as a response to an authentication start request, using the current time slot (S4603a).

As a result, comparison data in which a random value is embedded is generated as shown in FIG. 33, and is transmitted to radio base station apparatus 200a.

If a response destination and a base station authentication data sender are the same, a random value having the same value as a comparison data random value is entered in a data position in which a comparison data random value is entered in base station authentication data.

Therefore, base station authentication section 380 of radio terminal apparatus 300a can determine whether or not base station authentication data and comparison data match by, for example, performing an AND after conversion to binary data, and determining whether or not the result of the AND matches the comparison data.

Thus, radio terminal apparatus 300a according to this embodiment uses a combination including a random value, in addition to the three varying values described in Embodiment 1, in base station authentication data generation. Therefore, radio terminal apparatus 300a according to this embodiment enables still higher authentication security to be achieved.

In this embodiment, if a plurality of radio terminal apparatuses 300a select the same time slot simultaneously, corresponding random values in base station authentication data and comparative data do not match. In such a case, it is desirable for a radio terminal apparatus 300a that does not transmit a response due to overlapping with another radio terminal apparatus 300a to determine a data match based not on matching/non-matching of random values, but on whether or not a slot is one for which a response has been received. That is to say, in determining a radio terminal apparatus 300a data match, a data match is determined based on whether or not the value at a position corresponding to a selected time slot in base station authentication data is "0".

In the above-described embodiments, cases have been described in which a radio base station apparatus that is a radio communication apparatus being authenticated is fixed, and a radio terminal apparatus that is a radio communication apparatus performing authentication moves, but the present invention is not limited to this. All or some of a plurality of radio terminal apparatuses may be fixed while a radio base station apparatus moves, or both a plurality of radio terminal apparatuses and a radio base station apparatus may move.

Provision may also be made for a radio base station apparatus to add a data generation rule for comparison data corresponding to base station authentication data held by that radio base station apparatus as shared information. In this case, a comparison data generation section acquires a comparison data generation rule from shared information added to an authentication start request or base station authentication data. By this means, even if a data generation rule for base station authentication data differs for each radio base station apparatus, a radio terminal apparatus can always generate comparison data using a data generation rule corresponding to the radio base station apparatus currently being communicated with.

Also, a radio base station apparatus and each radio terminal apparatus may switch data generation rules for base station authentication data and comparison data used between them. When a data generation rule is switched for each base station authentication, the data generation rule execution order may be set in advance, or information indicating which data generation rule is to be used may be exchanged each time base station authentication is started.

Furthermore, base station authentication data need not necessarily be data in which per-slot identifiers are arranged, but need only be data that summarizes whether or not there is a response for each time slot for a plurality of time slots, and that can be analyzed on the radio terminal apparatus side. For example, one possibility is data in which the time slot number of a time slot for which there is a response is entered.

The disclosure of Japanese Patent Application No. 2009-51319, filed on Mar. 4, 2009, including the specification, drawings and abstract, is incorporated herein by reference in its entirety.

INDUSTRIAL APPLICABILITY

A radio base station apparatus, radio terminal apparatus, and base station authentication method according to the present invention are suitable for use as a radio base station apparatus, radio terminal apparatus, and base station authentication method that enable more radio terminal apparatuses to perform base station authentication within a fixed period of time.

REFERENCE SIGNS LIST

100 Radio communication system
200, 200a Radio base station apparatus
210, 310 Communication control section
220, 360, 360a Transmission section
230 Time slot management section
240, 240a, 320 Reception section
250, 250a Reception status management section
260 Base station authentication data generation section
300, 300a Radio terminal apparatus
330, 330a Time slot selection section
340, 340a Selection status management section
350, 350a Time slot management section
370 Comparison data generation section
380 Base station authentication section
390a Random number generation section

The invention claimed is:

1. A radio base station apparatus that performs radio communication with a plurality of radio terminal apparatuses by time division multiple access, the radio base station apparatus comprising:
a request transmitter structured to transmit an authentication start request requesting starting of base station authentication to each of the plurality of radio terminal apparatuses;
a response information receiver structured to receive response information from each of the plurality of radio terminal apparatuses as a response to the authentication start request, the response information indicating that the base station authentication is to be started from the plurality of radio terminal apparatuses;
a base station authentication data generator structured to generate base station authentication data summarizing information indicating whether or not the response information has been received for each time slot, the base station authentication data being information that associates an identifier indicating whether or not the response information receiver has received the response information for each time slot; and
a base station authentication data transmitter structured to transmit the generated base station authentication data to the plurality of radio terminal apparatuses,
wherein the base station authentication data is information in which identifiers are arranged in a predetermined order according to numbers of time slots.

2. The radio base station apparatus according to claim 1, further comprising a shared information notifier structured to add the predetermined order to the authentication start request or the base station authentication data as shared information.

3. A radio base station apparatus that performs radio communication with a plurality of radio terminal apparatuses by time division multiple access, the radio base station apparatus comprising:
a response information receiver structured to receive response information indicating that base station authentication is to be started from the plurality of radio terminal apparatuses;
a base station authentication data generator structured to generate base station authentication data summarizing information indicating whether or not the response information has been received for each time slot; and
a base station authentication data transmitter structured to transmit the generated base station authentication data to the plurality of radio terminal apparatuses,
wherein the base station authentication data transmitter does not transmit the base station authentication data when the number of time slots for which the response information is received exceeds a predetermined threshold value.

4. A radio terminal apparatus that is one of a plurality of radio terminal apparatuses that perform communication with a radio base station apparatus by time division multiple access, the radio terminal apparatus comprising:
a request receiver structured to receive an authentication start request requesting starting of base station authentication from the radio base station apparatus;
a time slot selector structured to select a time slot;
a response information transmitter structured to transmit response information, using the selected time slot, to the radio base station apparatus as a response to the authentication start request, the response information indicating that the base station authentication is to be started;
a comparison data generator structured to generate comparison data that associates an identifier indicating whether or not selection has been performed by the time slot selector for each time slot;
a base station authentication data receiver structured to receive base station authentication data in correspondence to the transmitted response information; and
a base station authenticator structured to perform base station authentication for a transmitter of the base station authentication data by comparing the generated comparison data and the received base station authentication data, based on whether or not the received base station authentication data indicates that the response information was received in the selected time slot,
wherein the comparison data is information in which identifiers are arranged in a predetermined order according to numbers of time slots.

5. The radio terminal apparatus according to claim 4, further comprising a shared information acquirer structured to acquire the predetermined order from shared information added to the authentication start request or the base station authentication data.

6. A radio base station apparatus that performs radio communication with a plurality of radio terminal apparatuses by time division multiple access, the radio base station apparatus comprising:

a request transmitter structured to transmit an authentication start request requesting starting of base station authentication to each of the plurality of radio terminal apparatuses;

a response information receiver structured to receive response information from each of the plurality of radio terminal apparatuses as a response to the authentication start request for each of the authentication start request, the response information including a random value selected from values other than a predetermined value indicating that the base station authentication is not to be started;

a base station authenticator structured to generate base station authentication data that associates the predetermined value for each time slot in which the response information receiver has not received the response information and associates the random value for each time slot in which the response information receiver has received the response information; and a base station authentication data transmitter structured to transmit the generated base station authentication data to the plurality of radio terminal apparatuses.

7. A radio terminal apparatus that is one of a plurality of radio terminal apparatuses that perform communication with a radio base station apparatus by time division multiple access, the radio terminal apparatus comprising:

a request receiver structured to receive an authentication start request requesting starting of base station authentication from the radio base station apparatus;

a time slot selector structured to select a time slot;

a response information transmitter structured to transmit response information, using the selected time slot, to the radio base station apparatus as a response to the authentication start request, the response information including a random value selected from values other than a predetermined value indicating that the base station authentication is not to be started;

a base station authentication data receiver structured to receive base station authentication data in correspondence to the transmitted response information; and a base station authenticator structured to perform base station authentication for a transmitter of the base station authentication data, based on whether or not the received base station authentication data associates the random value included in the response information for the selected time slot.

* * * * *